(12) United States Patent
Kaneiwa et al.

(10) Patent No.: US 7,213,984 B2
(45) Date of Patent: May 8, 2007

(54) OPTICAL DENSITY-CHANGING ELEMENT, OPTICAL ELEMENT AND PHOTOGRAPHIC UNIT

(75) Inventors: Hideki Kaneiwa, Kanagawa (JP); Ryuji Shinohara, Kanagawa (JP); Atsushi Matsunaga, Kanagawa (JP); Kiyoshi Morimoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 111 days.

(21) Appl. No.: 10/941,005

(22) Filed: Sep. 15, 2004

(65) Prior Publication Data

US 2005/0058445 A1    Mar. 17, 2005

(30) Foreign Application Priority Data

Sep. 16, 2003  (JP)  .......................... P.2003-323037
Mar. 29, 2004  (JP)  .......................... P.2004-095795
May 19, 2004  (JP)  .......................... P.2004-149490

(51) Int. Cl.
*G03B 9/02* (2006.01)
*G02F 1/155* (2006.01)

(52) U.S. Cl. ...................... 396/506; 359/275

(58) Field of Classification Search ............... 396/249, 396/262, 457, 506; 359/273, 275
See application file for complete search history.

(56) References Cited

U.S. PATENT DOCUMENTS

| | | | | |
|---|---|---|---|---|
| 5,457,564 A | * | 10/1995 | Leventis et al. | ............ 359/271 |
| 5,634,163 A | * | 5/1997 | Kamata | ...................... 396/458 |
| 5,983,057 A | * | 11/1999 | Matsuo et al. | .............. 399/207 |
| 6,067,184 A | * | 5/2000 | Bonhote et al. | ............ 359/265 |
| 6,614,577 B1 | * | 9/2003 | Yu et al. | ...................... 359/265 |

FOREIGN PATENT DOCUMENTS

| | | |
|---|---|---|
| JP | 9-244072 A | 9/1997 |
| JP | 2000-506629 A | 5/2000 |
| JP | 2003-511837 A | 3/2003 |

OTHER PUBLICATIONS

C. G. Granqvist, "Chromogenic Materials for Transmittance Control of Large-Area Windows", Solid State and Materials Sciences, 1990, vol. 16, pp. 291-308.

Rachel Cinnsealach, et al., "Electrochromic windows based on viologenmodified nanostructured $TiO_2$ films", Solar Energy Materials and Solar Cells, 1998, vol. 55, pp. 215-223.

David Cummins, et al., "Ultrafast Electronchromic Windows Based on Redox-Chromophore Modified Nanostructured Semiconducting and Conducting Films", Journal of Physical Chemistry B, 2000, vol. 104, pp. 11449-11459.

Anders Hagfeldt, et al., "Nanostructured $TiO_2$ Semiconductore Electrodes Modified with Surface Attached Viologens: Applications for Displays and Smart Windows", Proceedings of the SPIE, Jul. 12, 1995, vol. 2531, pp. 60-69.

* cited by examiner

*Primary Examiner*—W. B. Perkey
(74) *Attorney, Agent, or Firm*—Sughrue Mion, PLLC

(57) ABSTRACT

To provide an optical density-changing element which has excellent properties that it can be brought into a colored state by applying only a low voltage, that it shows a rapid response speed and becomes completely colorless when restored to a bleached state from the colored state, and which can undergo a change in optical density in response to an applied voltage, the optical density-changing element includes, on each of an anode and a cathode, a material capable of at least one of donating and accepting an electron and, as a result of at least one of donating and accepting the electron, undergoing a change in absorption spectrum in a visible region and a material undergoing substantially no change in absorption spectrum in the visible region, with potentials of these materials satisfying a specific relation defined in the specification.

20 Claims, 12 Drawing Sheets

OPTICAL DENSITY-CHANGING ELEMENT, OPTICAL ELEMENT AND PHOTOGRAPHIC UNIT

BACKGROUND OF THE INVENTION

1. Field of the Invention

The present invention relates to an optical density-changing element which can undergo a change in optical density in response to an applied voltage, and which has excellent properties of, for example, requiring only a small applied voltage to become in a colored state, responding at a high speed, and being completely bleached when restored to a bleached state from the colored state. In particular, the present invention relates to an electrochromic element; an optical element comprising the optical density-changing element and an electromotive force-generating element capable of generating an electromotive force upon irradiation with an electromagnetic wave; and a photographic unit using the optical element.

2. Background Art

Elements capable of undergoing a change in optical density in response to an electromagnetic wave find wide applications. Materials having the function of changing optical density in response to the electromagnetic wave, i.e., controlling transmission or reflection of light include photochromic materials, electrochromic materials and thermochromic materials.

The photochromic materials are materials capable of undergoing the change in optical density thereof upon irradiation with light, and have found applications to sunglasses, UV checkers, printing-related materials and fibrous processed products. However, these materials show only a slow response speed, and their use has been limited. Materials with an accelerated response speed are expected to find wider applications such as materials for vehicle window, display devices and camera-related optical elements.

Electrochromic materials are materials capable of undergoing the change in optical density thereof upon release or receipt of electrons, and have found applications to display devices, automatically dimmable rear-view mirrors for automobiles and window materials for vehicles. Electrochromic materials as display elements are expected to be more and more developed to realize large area displays, displays with a higher response speed, displays with a higher density and displays with a higher quality. In comparison with the photochromism, electrochromism provides a higher response speed, and hence there exists a high possibility of its application to not only display elements but camera-related optical elements as well.

The thermochromic materials are materials capable of undergoing the change in optical density thereof upon temperature change, and have found applications to toys, medicines and foods. Particularly in recent years, they have realized packaging members with a temperature-indicating function. In comparison with the electrochromism, however, thermochromism is slow in response speed and low in light transmission, and hence its use is limited, and its application to window materials for vehicles, display devices or camera-related optical elements involves difficulty.

The use of such optical density-changing material includes a photographic system such as a camera. For example, in recent years, a film-with-lens unit has come into wide use due to its handiness as a camera unit which eliminates the necessity of film-loading operation and enables one to take pictures immediately after buying it. In order to enhance its utilization values, development has become more and more active in recent years for enlarging a photographing range by loading a fast film. However, since conventional film-with-lens units whose advantage is handiness are not equipped with an exposure-controlling mechanism, film-with-lens units loaded with a fast film often cause overexposure in a high intensity region, and thus their weak point of "being difficult to use" has been revealed. Therefore, film-with-lens units wherein AE control system of measuring a light amount during photographing is introduced and which can automatically changing aperture depending upon the amount of photographic light have been placed on the market. Thus, frequency of so-called "unsuccessful photographs" due to the overexposure has been greatly reduced.

There have been proposed film-with-lens units using, as means for realizing a "light amount control filter" capable of controlling the incident light amount to a light-sensitive material according to the photographic light amount with more ease at an inexpensive cost, a compound which becomes colored or bleached corresponding to ON or OFF of irradiation with light, so-called "photochromic compound" (see, for example, JP-A-5-142700, JP-A-6-317815 and JP-A-2001-13301).

The photochromic compound is a compound which becomes colored, i.e., shows an increased optical density when irradiated with light, and becomes bleached, i.e., shows a decreased optical density when irradiation is stopped or when heated or irradiated with another light different in wavelength. As such compound, there are known silver halide-containing inorganic compounds and some organic compounds. It has been considered that light amount can be controlled by placing a filter made of the photochromic compound on the optical axis and making the filter colored or bleached according to the incident light amount.

However, it takes generally about one minute for the photochromic compound to become colored and takes longer than several ten minutes to become bleached (see, for example, Solid State and Material Science, 1990, 16, p. 291), and thus it has been difficult to use the compound for a light amount control system for controlling the photographic light amount.

In contrast, as materials which can be colored or bleached at a higher speed, there are illustrated "electrochromic compound" that is colored or discolored upon release or receipt of electrons. The electrochromic compound is a compound which shows an increased optical density upon release or receipt of electron by applying a voltage, and shows a decreased optical density upon electron transfer in reverse direction to the direction on increase in optical density, and it has been known that some metal oxides and organic compounds show this property.

A light amount control system has been proposed wherein a solar cell capable of generating electromotive force in response to light is layered on the electrochromic compound (see, for example, JP-A-9-244072). With this system, too, automatic light amount control according to the amount of light can be expected. However, it is unavoidable, with the structure wherein the solar cell is layered on the electrochromic compound layer as in the above-mentioned proposal, for part of light passing through the electrochromic compound layer to be absorbed by the solar cell. Therefore, it is inappropriate for a system which utilizes transmitted light as much as possible when photographing a scene not requiring light amount control, such as camera-related optical elements in particular.

On the other hand, as a particularly advantageous method for utilizing the electrochromic compound, a method of utilizing a nanoporous electrode wherein a material undergoing a change in optical density as a result of release or receipt of electrons is chemisorped on a nanoporous material is known. It is disclosed that an electrochromic element showing a rapid response speed can be produced by using such electrode (see, for example, JP-T-2000-506629, JP-T-2003-511837 (The term "JP-T" as used herein means a published Japanese translation of a PCT patent application.) and *Solar Energy Materials and Solar Cells,* 1998, 55, p. 215). As to the kind of the nanoporous material, JP-T-2000-506629 discloses a semiconductor material such as titanium oxide, and JP-T-2003-511837 discloses a metal oxide doped with impurity to metallic levels.

Also, an electrochromic element showing a higher response speed at becoming in a colored or bleached state by using a porous electrode of antimony-doped tin oxide having a less resistance than tin oxide has recently been reported (see, for example, *Journal of Physical Chemistry B,* 2000, 104, p. 11449).

As a result of intensive investigations on the electrochromic element utilizing the nanoporous electrode wherein (i) a material capable of releasing or receiving electrons (a material undergoing or not undergoing a change in optical density in a wavelength range of 400 to 700 nm as a result of release or receipt of electrons) is adsorbed on (ii) a nanoporous material, it has been found that the electrochromic element can show unfavorable performance depending upon combination of (i) material capable of releasing or receiving electrons and (ii) nanoporous material. The term "unfavorable performance" as used herein means that a more voltage is required for making the electrochromic element colored, that the electrochromic element shows a slow response speed, or that the electrochromic element is not made completely bleached when restored to the bleached state, and some of the color remains.

Also, in using for the automatic light amount control system such as that for controlling photographic light amount in a camera mentioned hereinbefore, an electric source for generating an appropriate electromotive force according to the light amount to control operation of the electrochromic element is necessary in addition to the electrochromic element.

It is naturally desired for the electrochromic element to require a small voltage for bringing it into a colored state, to show a rapid response speed, and to be completely bleached when restored to the bleached state from the colored state. It is eagerly desired not to deteriorate performance of the electrochromic element.

SUMMARY OF THE INVENTION

An object of the present invention is to provide an optical density-changing element capable of undergoing a change in optical density in response to an applied voltage, in particular an electrochromic element, the element having excellent performance of requiring only a small applied voltage for making it colored, showing a rapid response speed, and becoming completely bleached when restored to the bleached state from the colored state.

Another object of the invention is to provide an optical element comprising the above-mentioned optical density-changing element and an electromotive force-generating element which generates electromotive force upon irradiation with an electromagnetic wave, and to a photographic unit using the optical element.

A further object of the invention is to provide an optical element which realizes a light amount control system capable of automatically controlling the amount of transmitted light over a wide range light amount range with a less loss of transmitted light due to the system itself and a rapid response speed.

More specifically, an object of the invention is to provide an optical element to be used in a photographic system such as a camera unit, e.g., a film-with-lens unit not having the capability of changing shutter speed or aperture diameter:

(i) the optical element has a function of "a light amount control element" capable of automatically changing the amount of transmitted light according to the outer brightness and providing an expanded exposure latitude, i.e., solving both the problem of insufficient exposure upon photographing "a dark scene" and the problem of overexposure upon photographing "a bright scene" in a photographic system;

(ii) the optical element completes the changing the transmitted light amount sufficiently effective for the expanded exposure latitude within a short time of from decision of a photographing scene and pushing of the shutter; and (iii) the optical element itself loses transmitted light at a low level of causing no problems for use in a photographic system, and to provide a camera unit using this optical element.

The present invention provides an optical density-changing element having the following structure, an optical element and a photographic unit, so as to attain the above-described objects.

1. An optical density-changing element comprising:

an anode containing a first semiconductor material, the anode further comprising at least one of:

a material (a) capable of at least one of donating and accepting an electron, the material (a) undergoing a change in absorption spectrum in the wavelength range of 400 to 700 nm upon at least one of donating and accepting the electron, wherein the anode satisfies the relation of $-1.3 \leq Fba-Eo(a) \leq 0.3$ wherein Fba represents a flat band potential of the first semiconductor material and Eo(a) represents an oxidation potential of the material (a); and a material (b) capable of at least one of donating and accepting an electron, the material (b) undergoing substantially no change in absorption spectrum in the wavelength range of 400 to 700 nm upon at least one of donating and accepting the electron, wherein the anode satisfies the relation of $-1.3 \leq Fba-Eo(b) \leq 0.3$ wherein Fba represents the flat band potential of the first semiconductor material and Eo(b) represents an oxidation potential of the material (b); and a cathode containing a second semiconductor material, the cathode further comprising at least one of: a material (c) capable of at least one of donating and accepting an electron, the material (c) undergoing the change in absorption spectrum in the wavelength range of 400 to 700 nm upon at least one of donating and accepting the electron, wherein the cathode satisfies the relation of $-0.3 \leq Fbc-Er(c) \leq 1.3$ wherein Fbc represents a flat band potential of the second semiconductor material and Er(c) represents a reduction potential of the material (c); and a material (d) capable of at least one of donating and accepting an electron, the material (d) undergoing substantially no change in absorption spectrum in the wavelength range of 400 to 700 nm upon at least one of donating and accepting the electron, wherein the cathode satisfies the relation of $$-0.3 \leq Fbc-Er(d) \leq 1.3$$

wherein Fbc represents the flat band potential of the second semiconductor material and Er(d) represents a reduction potential of the material (d), wherein the optical density-changing material has at least one of (i) the material (a) in the anode, and (ii) the material (c) in the cathode; and the optical density-changing element undergoes the change in optical density in response to a voltage applied between the anode and the cathode.

2. The optical density-changing element as described in item 1, which contains in total at least three kinds of materials capable of at least one of donating and accepting an electron.

3. The optical density-changing element as described in item 1 or 2, which contains at least one of (iii) the material (b) in the anode, and (IV) the material (d) in the cathode.

4. The optical density-changing element as described in any one of items 1 to 3, which absorbs a plurality of lights in the wavelength range of 400 to 700 nm, the plurality of lights having different wavelength from each other.

5. The optical density-changing element as described in any one of items 1 to 4, which absorbs a blue light, a green light and a red light.

6. The optical density-changing element as described in any one of items 1 to 5, which has an absorption property of neutral gray.

7. The optical density-changing element as described in any one of items 1 to 6, which is transformed into a first bleached state in response to the voltage, the first bleached state having an optical density of 0.2 or less, preferably 0.125 or less, more preferably 0.1 or less, still more preferably 0.05 or less at a wavelength of 400 nm.

8. The optical density-changing element as described in any one of item 1 to 7, which is transformed into a second bleached state in response to the voltage, the second bleached state having a first average optical density of 0.1 or less, preferably 0.05 or less in a first wavelength sub-range of 400 to 500 nm, a second average optical density of 0.1 or less, preferably 0.05 or less in a second wavelength sub-range of 500 to 600 nm, and a third average optical density of 0.1 or less, preferably 0.05 or less in a third wavelength sub-range of 600 to 700 nm.

9. The optical density-changing element as described in any one of items 1 to 8, which has at least one of:

a first semiconductor layer in the anode, the first semiconductor layer comprising: the first semiconductor material; and the material (a) absorbed on the first semiconductor material, wherein the first semiconductor layer has a surface roughness coefficient of more than 20; and a second semiconductor layer in the cathode, the second semiconductor layer comprising: the second semiconductor material; and the material (c) absorbed on the first semiconductor material wherein the second semiconductor layer has the surface roughness coefficient of more than 20.

10. The optical density-changing element as described in item 9 wherein at least one of the first semiconductor layer and the second semiconductor layer has a surface resistance of less than $2 \times 10^8$ Ω/□, preferably less than $1 \times 10^8$ Ω/□.

11. The optical density-changing element as described in item 9 or 10, wherein at least one of the first semiconductor layer and the second semiconductor layer has a volume resistivity of less than $1 \times 10^5$ Ω·cm, preferably less than 50 Ω·cm.

12. The optical density-changing element as described in any one of items 9 to 11, wherein at least one of the first semiconductor material and the second semiconductor material contains a semiconductor particle having a particle size of 1 to 100 nm.

13. The optical density-changing element as described in any one of items 1 to 12, wherein at least one of the first semiconductor material and the second semiconductor material contains tin oxide.

14. The optical density-changing element as described in any one of items 1 to 12, wherein at least one of the first semiconductor material and the second semiconductor material contains antimony-doped tin oxide.

15. The optical density-changing element as described in any one of items 1 to 12, wherein at least one of the first semiconductor material and the second semiconductor material contains titanium oxide.

16. The optical density-changing element as described in any one of items 1 to 15, which has an antireflective layer.

17. An optical element comprising:

an optical density-changing element comprises: an anode containing a first semiconductor material; and a cathode containing a second semiconductor material, the optical density-changing element undergoing a change in optical density in response to an electromotive force between the anode and the cathode; and an electromotive force-generating element capable of generating the electromotive force between the anode and the cathode of the optical density-changing element in response to an electromagnetic wave, wherein the anode further comprising at least one of:

a material (a) capable of at least one of donating and accepting an electron, the material (a) undergoing the change in absorption spectrum in the wavelength range of 400 to 700 nm upon at least one of donating and accepting the electron, wherein the anode satisfies the relation of $$-1.3 \leq Fba-Eo(a) \leq 0.3$$

wherein Fba represents a flat band potential of the first semiconductor material and Eo(a) represents an oxidation potential of the material (a); and a material (b) capable of at least one of donating and accepting an electron, the material (b) undergoing substantially no change in absorption spectrum in the wavelength range of 400 to 700 nm upon at least one of donating and accepting the electron, wherein the anode satisfies the relation of $$-1.3 \leq Fba-Eo(b) \leq 0.3$$

wherein Fba represents the flat band potential of the first semiconductor material and Eo(b) represents an oxidation potential of the material (b); and the cathode further comprises at least one of:

a material (c) capable of at least one of donating and accepting an electron, the material (c) undergoing the change in absorption spectrum in the wavelength range of 400 to 700 nm upon at least one of donating and accepting the electron, wherein the cathode satisfies the relation of $-0.3 \leq Fbc - Er(c) \leq 1.3$ wherein Fbc represents a flat band potential of the second semiconductor material and Er(c) represents a reduction potential of the material (c); and a material (d) capable of at least one of donating and accepting an electron, the material (d) undergoing substantially no change in absorption spectrum in the wavelength range of 400 to 700 nm upon at least one of donating and accepting the electron, wherein the cathode satisfies the relation of $-0.3 \leq Fbc - Er(d) \leq 1.3$ wherein Fbc represents the flat band potential of the second semiconductor material and Er(d) represents a reduction potential of the material (d), and wherein the optical density-changing material has at least one of (i) the material (a) in the anode, and (ii) the material (c) in the cathode.

18. An optical element comprising:

an electromotive force-generating element capable of generating an electromotive force in response to an electromagnetic wave; and an optical density-changing element capable of undergoing a change in optical density in response to the electromotive force, wherein the optical density-changing element comprises a semiconductor layer comprising: a semiconductor material; and a material capable of undergoing the change in optical density, the material being adsorbed on the semiconductor material, and the semiconductor layer has a surface roughness coefficient of more than 20.

19. The optical element as described in item 18, wherein the optical density-changing element absorbs a visible light.

20. The optical element as described in item 18 or 19, wherein the optical density-changing element absorbs a plurality of visible lights different from each other.

21. The optical element as described in any one of items 18 to 20, wherein the optical density-changing element contains at least one of: a compound capable of being colored by oxidation; and a compound capable of being colored by reduction.

22. The optical element as described in any one of items 18 to 21, wherein the optical density-changing element has a response time of the change in optical density in response to the electromagnetic wave is 5 or less seconds, preferably 2 or less seconds, more preferably 0.3 or less seconds.

23. The optical element as described in any one of items 17 to 22, wherein the electromagnetic wave is at least one of an ultraviolet light and a visible light.

24. The optical element as described in any one of items 17 to 23, wherein the electromotive force-generating element has a light-receiving element comprising a semiconductor.

25. The optical element as described in any one of items 17 to 24, wherein the electromotive force-generating element has a light-receiving element comprising a silicon oxide or a titanium oxide.

26. The optical element as described in any one of items 17 to 25, wherein the optical density-changing element is transformed into a bleached state in response to electromotive force generated by the electromotive force-generating element, the bleached state having an optical density of 0.2 or less at a wavelength of 400 nm.

27. The optical element as described in any one of items 17 to 26, wherein the optical density-changing element increases an optical density of the optical density-changing element in response to an electromotive force of 1 V or more generated by the electromotive force-generating element.

28. The optical element as described in any one of items 17 to 27, wherein the optical density-changing element is a uniform element as a whole.

29. The optical element as described in any one of items 17 to 27, wherein the optical density-changing element forms a plurality of pixels.

30. The optical element as described in any one of items 17 to 29, wherein an optical density of the optical density-changing element, upon irradiation with the electromagnetic wave, becomes 0.5 or more, preferably 0.8 or more, more preferably 0.95 or more on average over a wavelength range of 400 to 700 nm.

31. A photographic unit comprising the optical element described in any one of items 17 to 30.

32. The photographic unit as described in item 31, which is a film-with-lens unit.

The optical density-changing element of the present invention, particularly electrochromic element, has excellent properties of, for example, requiring only a small applied voltage to become in a colored state, responding at a high speed, and becoming completely bleached when restored to a bleached state from the colored state, and can undergo a rapid change in optical density in response to an applied voltage.

Such optical density-changing element of the present invention is preferably combined with an electromotive force-generating element capable of generating an electromotive force upon irradiation with an electromagnetic wave to provide an optical element, and the optical element is preferably applied to a photographic unit such as a camera.

Also, according to the present invention, an illuminance range where photographing is possible can be expanded by loading on a film-with-lens or an electronic still camera an optical element capable of undergoing a change in optical density in response to an electromagnetic wave, particularly, an optical element wherein a solar cell capable of generating an electromotive force in response to, for example, an UV light or a visible light is connected to an electrochromic, light amount control filter capable of undergoing the change in optical density in response to the electromotive force.

Figure 1:
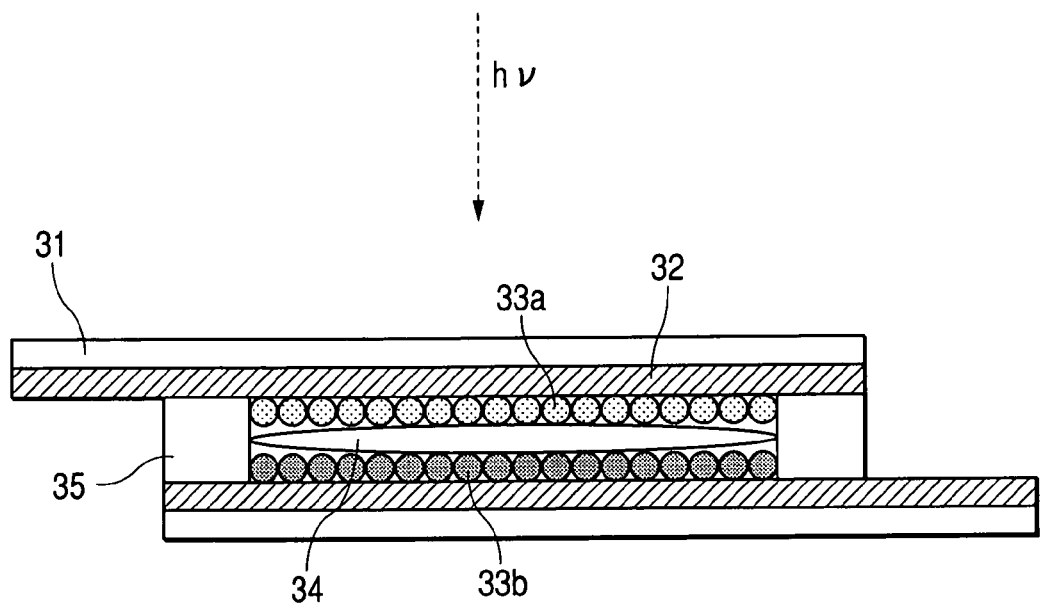
FIG. 1 is a schematic cross-sectional view showing one example of a typical constitution of the optical density-changing element of the invention.

The description of numerical references in the figure is set forth below.

1 film-with-lens unit
4 photographic lens
5 finder
6 light-emitting portion of strobe
8 shutter button
13 solar cell
16 photographic film
18 light-shading cylinder
20 lens holder
21 aperture
22 opening for exposure
23 light amount control filter
24 aperture
29 optical axis
31 support
32 electrically conductive layer
33a, b semiconductor material layer having adsorbed thereon an electrochromic material
34 electrolyte
35 spacer.

DETAILED DESCRIPTION OF THE INVENTION

The invention is described in more detail below.

In the invention, the term "optical density" as used herein means value A calculated according to the following formula (1):

$$A = -\log(I_T/I_O)$$

wherein $I_O$ represents an intensity of an incident light to the optical density-changing element, and $I_T$ represents an intensity of a transmitted light.

The term "nanoporous material" as used herein in the invention means a material wherein nanometer-order unevenness is formed on the surface thereof to increase the surface area so that a more amount of a substance may be adsorbed on the surface. The degree of porousness is represented in terms of "roughness coefficient".

The term "a roughness coefficient of nanoporous semiconductor material" as used herein in the invention means a proportion actually effective surface area to the projected surface area with respect to the surface of the semiconductor layer. Specifically, it can be measured according to BET method.

In the invention, the term "a bleached state" means a state wherein the optical density of the optical density-changing element is at a level as low as possible, for example, by short-circuiting the both electrodes of the optical density-changing element, or by applying a reverse voltage across the both electrodes, i.e., applying a voltage in the reverse direction to that applied upon coloration.

The term "a semiconductor material" as used herein in the invention is used according to the ordinary definition. For example, according to *Butsurigaku Jiten* (published by Baifukan), the term "a semiconductor material" means a substance having a middle electric resistance between metal and insulator.

The term "a material capable of at least one of donating (or releasing) and accepting (or receiving) an electron" as used herein in the invention includes both "a material undergoing a change in absorption spectrum in a wavelength range of 400 to 700 nm (electrochromic material)" and "a material undergoing substantially no change in absorption spectrum in the wavelength range of 400 to 700 nm (a colorless oxidizing or reducing material)". Also, the term "a material undergoing a change in absorption spectrum in a wavelength range of 400 to 700 nm" means a material which undergo a change in optical density by 0.05 or more in the wavelength range of 400 to 700 nm. On the other hand, the term "a material undergoing substantially no change in absorption spectrum in a wavelength range of 400 to 700 nm" means a material which do not undergo the change in optical density by 0.05 or more in the wavelength range of 400 to 700 nm.

The term "an oxidation potential Eo of a material capable of at least one of donating and accepting an electron" as used herein in the invention means an electric potential at which a net oxidation current becomes maximal, the net oxidation current being measured by CV (cyclic voltammetry) measurement of an electrode comprising a semiconductor material for an anode and the material, adsorbed on the semiconductor material, capable of at least one of donating and accepting the electron. Additionally, the term "net oxidation current" as used herein means a current value obtained by subtracting a first current value obtained by measurement of the semiconductor material for the anode not having the material capable of at least one of donating and accepting the electron (i.e., the semiconductor material for the anode alone) according to CV method; from a second current value obtained by measurement of the semiconductor material for the anode and the material, adsorbed on the semiconductor material, capable of at least one of donating and accepting the electron according to CV method.

The term "a reduction potential Er of a material capable of at least one of donating and accepting an electron" as used herein in the invention means an electric potential at which a net reduction current becomes maximal, the net reduction current is measured by CV measurement of an electrode comprising a semiconductor material for a cathode and the material, adsorbed on the semiconductor material, capable of at least one of donating and accepting the electron. Additionally, the term "net reduction current" as used herein means a current value obtained by subtracting a first current value obtained by measurement of the semiconductor material for the cathode not having the material capable of at least one of donating and accepting the electron (i.e., the semiconductor material for the cathode alone) according to CV method; from a second current value obtained by measurement of the semiconductor material for the cathode and the material, adsorbed on the semiconductor material, capable of at least one of donating and accepting the electron according to CV method.

Also, the CV measurement is conducted at 25° C. by constituting the same structure as that of an electrochromic element. For example, as a solution for use in the CV measurement, a solution prepared by dissolving a supporting electrolyte in the same concentration in the same solvent as with an electrolytic solution of the electrochromic element is used, and a treatment is conducted so as to minimize the concentration of oxygen and water. Additionally, as to the CV method, reference may be made to, for example, *Denkikagaku Sokuteiho* (published by Gihodo).

The term "a flat band potential of a semiconductor material" as used herein in the invention means a flat band potential measured according to MS (Mott-Schottky) method. The MS measurement is also conducted at 25° C. by constituting the same structure as that of an electrochromic element as with the CV measurement. For example, as a solution for use in the CV measurement, a solution prepared by dissolving a supporting electrolyte in the same concentration in the same solvent as with an electrolytic solution of the electrochromic element is used, and a treatment is conducted so as to minimize the concentration of oxygen and water. Additionally, as to the MS method, reference may be made to, for example, *Denkikagaku Sokuteiho* (published by Gihodo).

On the cathode, in the case where the flat band potential Fbc of the semiconductor material for the cathode is at a too much positive (noble) position with respect to the reduction potential Er of the material capable of at least one of donating and accepting an electron, a large voltage is required for coloring the electrochromic element, and the response speed of from a colored state to a bleached state becomes slow. On the other hand, in the case where the Fbc potential is at a negative (base) position with respect to the Er potential, the electrochromic element freely responds to irradiation with light even when no voltage is applied to become colored, thus control through voltage being difficult.

On the anode, in the case where the flat band potential Fba of the semiconductor material for the anode is at a positive (noble) position with respect to the oxidation potential Eo of the material capable of at least one of donating and accepting an electron, the electrochromic element freely responds to irradiation with light even when no voltage is applied to become colored and, in some cases, control through voltage can be difficult. On the other hand, in the case where the Fba potential is at a too negative (base) position with respect to the Eo potential, a large voltage is required for coloring the electrochromic element, and the response speed of from a colored state to a bleached state becomes slow.

The optical density-changing element of the invention preferably has, on the cathode, at least one material capable of at least one of donating and accepting an electron, the material satisfies the relation of:

$-0.3 \leq Fbc-Er \leq 1.3$, preferably $-0.2 \leq Fbc-Er \leq 1.2$, particularly preferably $-0.1 \leq Fbc-Er \leq 1.1$.

Also, the optical density-changing element preferably has, on the anode, at least one material capable of at least one of donating and accepting an electron, the material satisfies the relation of:

$-0.3 \leq Fba-Er \leq 0.3$, preferably $-1.2 \leq Fba-Er \leq 0.2$, particularly preferably $-1.1 \leq Fba-Er \leq 0.1$.

The term "adsorption of an electrochromic material (or a colorless oxidizing or reducing material) onto a nanoporous semiconductor material" as used herein in the invention means the phenomenon that an electrochromic material (or a colorless oxidizing or reducing material) is bound to the surface of a, nanoporous semiconductor material through chemical bond or physical bond, with the definition of adsorption conforming to the general definition.

The amount of an electrochromic material adsorbed onto the surface of a nanoporous semiconductor material can be detected, for example, according to the following method.

A nanoporous semiconductor material onto which an electrochromic material seems to have adsorbed is dipped in a 0.1 M NaOH solution, and the resulting mixture is shaked at 40° C. for 3 hours. The amount of the solution to be used is determined depending upon coated amount of the nanoporous semiconductor material, with 0.5 ml being appropriate per $g/m^2$ of the coated amount. After the shaking, the absorption spectrum of the solution is measured by means of a spectrophotometer to detect the amount of the electrochromic material adsorbed onto the surface of the nanoporous semiconductor material. Additionally, kind of the dipping solution (in this case, NaOH), concentration of the solution, temperature upon shaking and shaking period are determined depending upon kind of the used nanoporous material and kind of the used electrochromic material, and are not limited to the above-mentioned ones.

Additionally, an adsorption amount of a colorless oxidizing or reducing material can also be detected by the same means. In this occasion, other means (for example, high pressure liquid chromatography) may be employed in the case where the detection by the spectrophotometer is difficult because of, for example, too short wavelength of the absorption peak.

The term "surface resistance of a semiconductor layer" as used herein in the invention means a surface resistance value of a semiconductor layer measured in the state where only the semiconductor material layer exists.

The term "electromagnetic wave" as used herein in the invention conforms to its general definition. For example, according to *Butsurigaku Jiten* (published by Baifukan), electric field and magnetic field include a static field which is temporally constant and a wave field which changes with time and spreads to a far distant place, and the wave field is determined as the electromagnetic wave. Specifically, the electromagnetic wave is classified into γ-ray, X-ray, UV-ray, visible light, infrared ray and radio wave. The electromagnetic wave to be used in the invention includes all of them but, in the case of applying the optical element of the invention to the light amount control system for a camera unit, UV-ray, visible light and infrared ray are particularly preferred, with UV-ray and visible light being more preferred.

The optical density-changing element of the invention can undergo a change in density thereof upon applying a voltage from outside. Also, the optical element of the invention using the optical density-changing element is characterized in that a voltage-supplying source which drives the optical density-changing element is an electromotive force-generating element capable of generating an electromagnetic force in response to an electromagnetic wave. Thus, the optical element of the invention can be utilized as a light amount control element capable of controlling the amount of light transmitting through the optical element in response to the intensity of an electromagnetic wave.

Each of the elements in the optical density-changing element and the optical element of the invention is described below.

The term "element capable of generating an electromotive force (electromotive force-generating element)" as used herein in the invention means an element which converts electromagnetic wave energy to electric energy. More specifically, a solar cell which converts sunlight to electric energy is illustrated. Materials constituting the solar cell include single crystal silicon, polycrystalline silicon and amorphous silicon, and compounds such as cadmium telluride and indium selenide copper. As the solar cell using the compound, a proper one may be selected to use from known ones depending upon the end use of the optical element of the invention.

Also, techniques described, for example, in Nature, vol. 353, pp. 737–740, 1991, U.S. Pat. No. 4,927,721 and JP-A-2002-75443 on a photoelectric transfer element using an oxide semiconductor sensitized with a dye (hereinafter abbreviated as "dye-sensitized photoelectric transfer element)" and a photo-electro-chemical cell may be utilized for the electromotive force-generating element of the invention. Such dye-sensitized photoelectric transfer element is also preferred as the electromotive force-generating element of the invention.

Also, an electromagnetic wave sensor and a voltage source may be combined with each other to constitute an electromotive force-generating element. The electromagnetic wave sensor to be used in this case is not particularly limited, and includes a phototransistor, a CdS sensor, a photodiode, CCD, CMOS, NMOS and a solar cell. As materials for the electromagnetic wave sensor, an appropriate one can be selected depending upon the wavelength of an electromagnetic wave to which the sensor is intended to respond. The voltage source is not particularly limited, and includes a dry cell, a lead storage battery, a Diesel generator and an aerogenerator. The dry cell includes both primary batteries such as an alkali dry cell and a manganese dry cell and secondary batteries such as a nickel-cadmium battery, a nickel-hydrogen battery and a lithium ion battery.

Preferred examples of the electromotive force-generating element of the invention include a solar cell using single crystal silicon, polycrystalline silicon or amorphous silicon as its material, a dye-sensitized photoelectric transfer element, and a combination of phototransistor and dry cell. In the case of applying the optical element of the invention to a camera unit, the electromotive force-generating element is preferably the one that generates electromotive force in proportion to the intensity of irradiated electromagnetic wave (particularly, sunlight).

The term "element capable of undergoing a change in optical density (optical density-changing element)" as used herein in the invention means an element which undergoes a change in optical density in response to the electromotive force generated by the electromotive force-generating element, i.e., an electric energy and, as a result, undergoes a change in percent transmission for electromagnetic wave.

The optical density-changing element comprises a nanoporous semiconductor material on which at least one of "a material undergoing a change in absorption spectrum in a wavelength range of 400 to 700 nm as a result of at least one of donating and accepting an electron on the surface of an electrode (electrochromic material)" and "a material undergoing no change in absorption spectrum in the wavelength range of 400 to 700 nm as a result of at least one of donating and accepting an electron on the surface of an electrode (a colorless oxidizing or reducing material)", an electrically conductive layer supporting the nanoporous semiconductor material, and an electrolyte in which a supporting salt is dissolved. FIG. 1 shows one embodiment of a typical constitution of the optical density-changing element. In FIG. 1, an electrochromic material and a colorless oxidizing or reducing material are adsorbed onto electrodes (anode (33a) and cathode (33b)) comprising a nanoporous semiconductor material having a large surface area. The electrochromic material undergoes the change in optical density in the wavelength range of 400 to 700 nm in response to an electric energy supplied from an electrically conductive layer 32. The light transmitting through the optical density-changing element is absorbed by the electrochromic material in proportion to the change in optical density of the electrochromic material. As a result, the amount of light transmitted through the optical density-changing element changes. Form of the optical density-changing element is not limited only to that shown by FIG. 1, and the element may be in a various form depending upon the end use thereof. Examples of the form include an optical filter, a lens, an aperture, a mirror, a window, glasses, and a display panel. In the case of using the element in a camera unit, preferred form of the element includes an optical filter, a lens and an aperture.

Materials of the support 31 constituting the optical density-changing element are not particularly limited, and examples thereof include glass, plastics, polyethylene terephthalate (PET), polyethylene naphthalate (PEN), triacetyl cellulose (TAC), polycarbonate (PC), polysulfone, polyether sulfone (PES), polyether ether ketone, polyphenylene sulfide, polyallylate (PAR), polyamide, polyimide (PIM), polystyrene, norbornene resin (ARTON), acrylic resin and polymethyl methacrylate (PMMA). An appropriate material may be selected depending upon the end use and form thereof. It is preferred to select a material which less absorbs the electromagnetic wave which the optical element of the invention utilizes. Glass, PET, PEN, TAC or acrylic resin is particularly preferred for a light of 400 to 700 nm in $\lambda$. Also, in order to avoid loss of transmitted light due to reflection on the support surface, it is preferred to provide an antireflective layer (for example, a thin film layer of silicon oxide). In addition, various functional layers such as a shock-absorbing layer for preventing the element from being shocked, an antiscratching layer for preventing the element from being damaged by friction and an electromagnetic wave-absorbing layer for filtering off other electromagnetic wave than is necessary (for example, ultraviolet rays with an optical element designed for a visible light) may be provided on the surface of the element.

The electrically conductive layer 32 constituting the optical density-changing element is not particularly limited, and includes a metal thin film (thin film of gold, silver, copper, chromium, palladium, tungsten or the alloy thereof), an oxide semiconductor film (film of tin oxide, silver oxide, zinc oxide, vanadium oxide, ITO (indium oxide doped with tin oxide), antimony-doped tin oxide (ATO), FTO (fluorine-doped tin oxide) or AZO (aluminum-doped zinc oxide)), an electrically conductive nitride thin film (thin film of titanium nitride, zirconium nitride or hafnium nitride), an electrically conductive boride thin film (thin film of $LaB_6$), a spinel type compound film (thin film of $MgInO_4$ or $CaGaO_4$), an electrically conductive high polymer film (film of polypyrrole/$FeCl_3$), an ion-conductive film (film of polyethylene oxide/$LiClO_4$) and an inorganic-organic composite film (indium oxide fine powder/saturated polyester resin). It is preferred to select a member which less absorbs the electromagnetic wave which the optical element of the invention utilizes. Tin oxide, FTO and ITO are particularly preferred for a light of 400 to 700 nm in $\lambda$. Also, the electrically conductive layer is preferably as thin as possible as long as a desired conductivity is ensured. To be more specific, the thickness of the electrically conductive layer is preferably 1000 nm or less, more preferably 200 nm or less, particularly preferably 100 nm or less.

The semiconductor materials constituting the optical density-changing element are not particularly limited, and examples thereof include metal oxides, metal sulfides and metal nitrides as shown below.

The metal oxides are not particularly limited, and examples thereof include titanium oxide, zinc oxide, silicon oxide, lead oxide, tungsten oxide, tin oxide, indium oxide, niobium oxide, cadmium oxide, bismuth oxide, aluminum oxide, ferrous oxide, the composite compound thereof, and those obtained by doping these oxides with fluorine, chlorine, antimony, phosphorus, arsenic, boron, aluminum, indium, gallium, silicon, germanium, titanium, zirconium, hafnium or tin. Also, titanium oxide having coated on the surface thereof ITO, antimony-doped tin or FTO may be used.

The metal sulfides are not particularly limited, and examples thereof include zinc sulfide, cadmium sulfite and the composite compound thereof, and those obtained by doping these sulfides with aluminum, gallium or indium. Also, those which are obtained by coating the surface of other material with the metal sulfide may be used.

The metal nitrides are not particularly limited, and examples thereof include aluminum nitride, gallium nitride, indium nitride and the composite compound thereof, and those which are obtained by doping them with a small amount of foreign atom (e.g., tin or germanium). Also, those which are obtained by coating the surface of other material with the metal nitride may be used. It is preferred to select the one which less absorbs the electromagnetic wave that the optical element of the invention utilizes, and titanium oxide, tin oxide, zinc oxide, zinc sulfide or gallium nitride is preferred for a light of from 400 to 700 nm in $\lambda$, with tin oxide or zinc oxide being particularly preferred.

The invention realizes smooth transfer of electrons from and to the electrochromic material by adsorbing the electrochromic material onto the semiconductor material, thus enabling the optical density-changing element to undergo the change in optical density in a short time. With the element, the larger the amount of electrochromic material adsorbed on the semiconductor material, the deeper becomes the density of coloration. In order to permit adsorption of the electrochromic material in more amount, it is preferred for the semiconductor material to have a roughness coefficient of 20 or more, particularly preferably 150 or more by making the semiconductor material nanoporous to thereby increase the surface area.

As means for forming such porous structure, there is illustrated a method of binding nanometer-order ultra-fine particles. In this case, loss of transmitted light due to absorption or diffusion of the electromagnetic wave by the semiconductor material can be minimized by optimizing size of the used particles or dispersion property of size. The particle size of the particles to be used is preferably 100 nm or less, more preferably from 1 nm to 60 nm, more preferably from 2 nm to 40 nm. Also, the size is preferably monodisperse. Also, the response speed of the optical element in accordance with the invention can be accelerated by optimizing the particle size and dispersion property of size as well.

In the invention, two or more layers of the semiconductor material having adsorbed thereon the electrochromic material may be used. The layers may have the same or different composition. A semiconductor having adsorbed thereon an electrochromic material may be combined with a semiconductor material not having adsorbed thereon any electrochromic material to use.

In order to accelerate transfer of electrons from and to the electrochromic material, the surface resistance of the semiconductor material layer is preferably less than $2\times10^8$ $\Omega/\square$, particularly less than $1\times10^5$ $\Omega/\square$ (or less than $1\times10^5$ $\Omega\cdot cm$, particularly 50 $\Omega\cdot cm$ in terms of volume resistivity).

To dope with an appropriate foreign metal is effective for reducing surface resistance of the semiconductor material layer. Also, the response speed of the optical element of the invention can be accelerated by optimizing the particle size and dispersion property of the size.

Examples of the electrochromic material constituting the optical density-changing element include organic dyes such as viologen dyes, phenothiazine dyes, styryl dyes, ferrocene dyes, anthraquinone dyes, pyrazoline dyes, fluoran dyes and phthalocyanine dyes; electrically conductive high molecular compounds such as polystyrene, polythiophene, polyaniline, polypyrrole, polybenzyne and polyisothianaphthene; inorganic compounds such as tungsten oxide, iridium oxide, nickel oxide, cobalt oxide, vanadium oxide, molybdenum oxide, titanium oxide, indium oxide, chromium oxide, manganese oxide, Prussian blue, indium nitride, tin nitride and zirconium chloronitride.

In the invention, the term "group" used for representing a specific moiety of an organic compound means that the moiety itself may be substituted by one or more (up to the possible maximal number) of substituents or may not be substituted. For example, "alkyl group" means a substituted or unsubstituted alkyl group.

When such substituent is represented by W, the substituent represented by W is not particularly limited, and examples thereof include a halogen atom, an alkyl group (including a cycloalkyl group, a bicycloalkyl group and a tricycloalkyl group), an alkenyl group (including a cycloalkenyl group and a bicycloalkenyl group), an alkynyl group, an aryl group, a hetero ring group, a cyano group, a hydroxyl group, a nitro group, a carboxyl group, an alkoxy group, an aryloxy group, a silyloxy group, a hetero ring oxy group, an acyloxy group, a carbamoyloxy group, an alkoxycarbonyloxy group, an aryloxycarbonyloxy group, an amino group (including an alkylamino group, an arylamino group and a hetero ring amino group), an ammonia group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a hetero ring thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl- or hetero ring azo group, an imido group, a phosphino group, a phosphinyl group, a phosphinyloxy group, a phosphinylamino group, a phosphono group, a silyl group, a hydrazine group, a ureido group, a boric acid group (—B(OH)$_2$), a phosphato group (—OPO(OH)$_2$), a sulfato group (—OSO$_3$H) and other known substituents.

Also, two W's may cooperate to form a ring (an aromatic or non-aromatic hydrocarbon ring, or a hetero ring; these being optionally combined to form a polycyclic condensed ring; examples thereof including a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxthine ring, a phenothiazine ring and a phenazine ring).

Of the substituents represented by W, those which have a hydrogen may be freed of the hydrogen atom and substituted at the position by the above-mentioned group. Examples of such substituent include —CONHSO$_2$— group (a sulfonylcarbamoyl group or a carbonylsulfamoyl group), —CONHCO— group (a carbonylcarbamoyl group) and —SO$_2$NHSO$_2$— group (a sulfonylsulfamoyl group). More specific examples include an alkylcarbonylaminosulfonyl group (e.g., acetylaminosulfonyl), an arylcarbonylaminosulfonyl group (e.g., a benzoylaminosulfonyl group), an alkylsulfonylaminocarbonyl group (e.g., methylsulfonylaminocarbonyl) and an arylsulfonylaminocarbonyl group (e.g., p-methylphenylsulfonylaminocarbonyl).

Viologen dyes are compounds typically represented by the structures of, for example, formulae (1), (2) and (3).

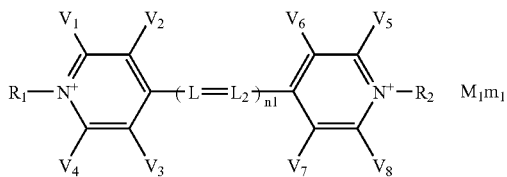
(1)

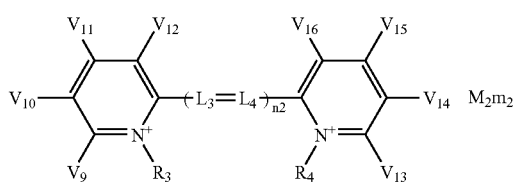
(2)

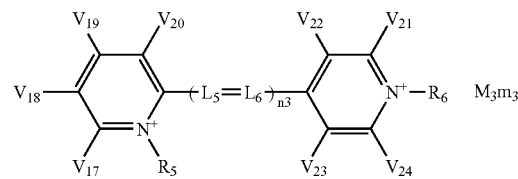
(3)

In the formulae (1), (2) and (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each represents a hydrogen atom or a monovalent substituent.

$R_1$, $R_2$, $R_3$, $R_4$, $R_5$ and $R_6$ each represents a hydrogen atom, an alkyl group, an aryl group or a hetero ring group.

$L_1$, $L_2$, $L_3$, $L_4$, $L_5$ and $L_6$ each represents a methane group or a nitrogen atom.

$n_1$, $n_2$ and $n_3$ each represents 0, 1 or 2.

$M_1$, $M_2$ and $M_3$ each represents an electric charge-balancing counter ion, and $m_1$, $m_2$ and $m_3$ each represents a number of 0 or more necessary for neutralizing electric charge of the molecule.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each represents a hydrogen atom or a monovalent substituent, and V's may be connected to each other or may form a ring. Also, V's may be connected to $R_1$, $R_2$, $R_3$, $R_4$, $R_5$, $R_6$, $L_1$, $L_2$, $L_3$, $L_4$, $L_5$ or $L_6$.

Examples of the monovalent substituent include those represented by foregoing W.

$R_1$, $R_2$, $R_3$, $R_4$, $R_5$ and $R_6$ each represents a hydrogen atom, an alkyl group, an aryl group or a hetero ring group, preferably an alkyl group, an aryl group or a hetero ring group, more preferably an alkyl group or an aryl group, particularly preferably an alkyl group. Specific examples of the alkyl group, aryl group and hetero ring group represented by $R_1$ to $R_6$ include an unsubstituted alkyl group having preferably from 1 to 18 carbon atoms, more preferably from 1 to 7 carbon atoms, particularly preferably from 1 to 4 carbon atoms (e.g., methyl, ethyl, propyl, isopropyl, butyl, isobutyl, hexyl, octyl, dodecyl or octadecyl), a substituted alkyl group having preferably from 1 to 18 carbon atoms, more preferably from 1 to 7 carbon atoms, particularly preferably from 1 to 4 carbon atoms {e.g., an alkyl group having W as a substituent; particularly preferably an alkyl group having an acid group; the acid group being a group having a dissociative proton, specifically a group releasing proton depending upon pka and surrounding pH such as a sulfo group, a carboxyl group, a sulfato group, —CONHSO$_2$— group (a sulfonylcarbamoyl group or a carbonylsulfamoyl group), —CONHCO— group (a carbonylcarbamoyl group), —SO$_2$NHSO$_2$— group (a sulfonylsulfamoyl group), a sulfonamido group, a sulfamoyl group, a phosphato group (—OP(=O)(OH)$_2$), a phosphono group (—P(=O)(OH)$_2$), a boric acid group and a phenolic hydroxyl group, preferably a proton-releasing acidic group which dissociates 90% or more at a pH between 5 and 11, more preferably a sulfo group, a carboxyl group, —CONHSO$_2$— group, —CONHCO— group, —SO$_2$NHSO$_2$— group, a phosphato group or a phosphono group, more preferably a carboxyl group, a phosphato group or a phosphono group, still more preferably a phosphato group or a phosphono group, most preferably a phosphono group; specific preferred examples of the substituted alkyl group including an aralkyl group (e.g., benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (e.g., allyl or vinyl; i.e., the substituted alkyl group including an alkenyl group and an alkynyl group), a hydroxyalkyl group (e.g., 2-hydroxyethyl or 3-hydroxypropyl), a carboxyalkyl group (e.g., carboxymethyl, 2-carboxyethyl, 3-carboxypropyl or 4-carboxybutyl), a phosphatoalkyl group (e.g., phosphatomethyl, 2-phosphatoethyl, 3-phosphatopropyl or 4-phosphatobutyl), a phosphonoalkyl group (e.g., phosphonomethyl, 2-phosphonoethyl, 3-phosphonopropyl or 4-phosphonobutyl), an alkoxyalkyl group (e.g., 2-methoxyethyl or 2-(2-methoxyethoxy)ethyl), an aryloxyalkyl group (e.g., 2-phenoxyethyl, 2-(4-biphenyloxy)ethyl, 2-(1-naphthoxy)ethyl, 2-(4-sulfophenoxy)ethyl or 2-(2-phosphophenoxy)ethyl), an alkoxycarbonylalkyl group (e.g., ethoxycarbonylmethyl or 2-benzyloxycarbonylethyl), an aryloxycarbonylalkyl group (e.g., 3-phenoxycarbonylpropyl or 3-sulfophenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), a sulfoalkyl group (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl or 3-(2-pyridyl)-3-sulfopropyl), a sulfoalkenyl group, a sulfatoalkyl group (e.g., 2-sulfatoethyl, 3-sulfatopropyl or 4-sulfatobutyl), a hetero ring-substituted alkyl group (e.g., 2-(pyrrolidin-2-on-1-yl)ethyl, 2-(2-pyridyl)ethyl, tetrahydrofurfuryl or 3-pyridiniopropyl), an alkylsulfonylcarbamoylalkyl group (e.g.,methanesulfonylcarbamoylmethyl), an acylcarbamoylalkyl group (e.g., acetylcarbamoylmethyl), an acylsulfamoylalkyl group (e.g., acetylsulfamoylmethyl), an alkylsulfonylsulfamoylalkyl group (e.g., methanesulfonylsulfamoylmethyl), an ammonioalkyl group (e.g.,3-(trimethylammonio)propyl or 3-ammoniopropyl), an aminoalkyl group (e.g., 3-aminopropyl, 3-(dimethylamino)propyl or 4-(methylamino)butyl) and a guanidinoalkyl group (e.g., 4-guanidinobutyl)}, a substituted or unsubstituted aryl group having preferably from 6 to 20 carbon atoms, more preferably from 6 to 10 carbon atoms, particularly preferably from 6 to 8 carbon atoms (the substituted aryl group being, for example, an aryl group having W as a substituent, particularly preferably an aryl group having an acid group, more preferably an aryl group substituted by a carboxyl group, a phosphato group or a phosphono group, particularly preferably an aryl group substituted by a phosphato group or a phosphono group, most preferably an aryl group substituted by a phosphono group; specific examples thereof including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl and 4-phosphonophenyl), and a substituted or unsubstituted hetero ring group having preferably from 1 to 20 carbon atoms, more preferably from 3 to 10 carbon atoms, particularly preferably from 4 to 8 carbon atoms (the substituted hetero ring group being a hetero ring group substituted by, for example, W having been illustrated as examples of substituent, more preferably a hetero ring group having an acid group, still more preferably a hetero ring group substituted by a carboxyl group, a phosphato group or a phosphono group, particularly preferably a hetero ring group substituted by a phosphato group or a phosphono group, most preferably a hetero ring group substituted by a phosphono group; specific examples thereof including 2-furyl, 2-thienyl, 2-pyridyl, 3-pyrazolyl, 3-isoxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl and 4-phosphato-2-pyridyl).

Also, they may be connected to other R, $V_1$ to $V_{24}$ or $L_1$ to $L_6$.

$L_1$, $L_2$, $L_3$, $L_4$, $L_5$ and $L_6$ each independently represents a methine group or a nitrogen atom, preferably a methine group. The methine group represented by $L_1$ to $L_6$ may have a substituent, and examples of the substituent include aforementioned W. Examples of W include a substituted or unsubstituted alkyl group having from 1 to 15 carbon atoms, preferably from 1 to 10 carbon atoms, particularly preferably from 1 to 5 carbon atoms (e.g., methyl, ethyl, 2-carboxyethyl, 2-phosphatoethyl or 2-phosphonoethyl), a substituted or unsubstituted aryl group having from 6 to 20 carbon atoms, preferably from 6 to 15 carbon atoms, still more preferably from 6 to 10 carbon atoms (e.g., phenyl, o-carboxyphenyl, o-phosphatophenyl or o-phosphonophenyl), a substituted or unsubstituted hetero ring group having from 3 to 20 carbon atoms, preferably from 4 to 15 carbon atoms, still more preferably from 6 to 10 carbon atoms (e.g., N,N-dimethylbarbituric acid group), a halogen atom (e.g., chlorine, bromine, iodine or fluorine), an alkoxy group having from 1 to 15 carbon atoms, preferably from 1 to 10 carbon atoms, still more preferably from 1 to 5 carbon atoms (e.g., methoxy or ethoxy), an amino group having from 0 to 15 carbon atoms, preferably from 2 to 10 carbon atoms, still more preferably from 4 to 10 carbon atoms (e.g., methylamino, N,N-dimethylamino, N-methyl-N-phenylamino or N-methylpiperazino), an alkylthio group having from 1 to 15 carbon atoms, preferably from 1 to 10 carbon atoms, still more preferably from 1 to 5 carbon atoms (e.g., methylthio or ethylthio) and an arylthio group having from 6 to 20 carbon atoms, preferably from 6 to 12 carbon atoms, still more preferably from 6 to 10 carbon atoms (e.g., phenylthio or p-methylphenylthio). The methine group may be connected to other methine group to form a ring, or may be connected to $V_1$ to $V_{24}$ or $R_1$ to $R_6$.

$n_1$, $n_2$ and $n_3$ each represents 0, 1 or 2, preferably 0 or 1, still more preferably 0. When $n_1$ to $n_3$ are 2 or more, the repeated methine group or nitrogen atom is not necessarily the same.

When necessary for neutralizing ion charge of the compounds, $M_1$, $M_2$ and $M_3$ are included in the formulae to show the presence of cation or anion. Examples of typical cation include inorganic ions such as hydrogen ion ($H^+$), an alkali metal ion (e.g., sodium ion, potassium ion or lithium ion) and an alkaline earth metal ion (e.g., calcium ion) and organic ions such as an ammonium ion (e.g., ammonium ion, tetraalkylammonium ion, triethylammonium ion, pyridinium ion, ethylpyridium ion or 1,8-diazabicyclo[5.4.0]-7-undecenium ion). The anion may be an inorganic anion or an organic anion, and examples thereof include a halide anion (e.g., fluoride ion, chloride ion or iodide ion), a substituted arylsulfonate ion (e.g., p-toluenesulfonate ion or p-chlorobenzenesulfonate ion), an aryldisulfonate (e.g., 1,3-benzenedisulfonate ion, 1,5-naphthalenedisulfonate ion or 2,6-naphthalenedisulfonate ion), an alkylsulfate ion (e.g., methylsulfate ion), sulfate ion, thiocyanate ion, perchlorate ion, tetrafluoroborate ion, picrate ion, acetate ion and trifluoromethanesulfonate ion. Further, ionic polymers or other dye having a reverse charge to the viologen dye may be used. Also, $CO_2^-$, $SO_3^-$ and $P(=O)(-O^-)_2$ may be shown as $CO_2H$, $SO_3H$ and $P(=O)(-OH)_2$, respectively, when they have hydrogen ion as a counter ion.

m1, m2 and m3 each represents a number of 0 or more necessary for balancing charge and, preferably, a number of from 0 to 4, more preferably from 0 to 2 and, in the case where a salt is formed within the molecule, they represent 0.

Specific examples of the viologen dye are illustrated below which, however, are not to be construed as limitative.

V-1
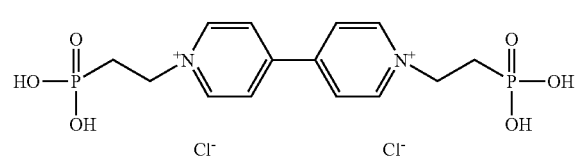

V-2
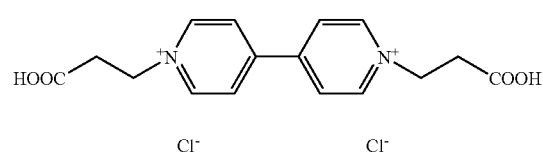

V-3
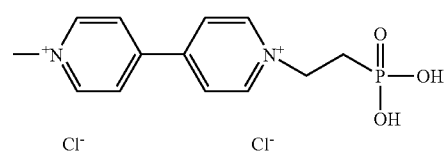

V-4
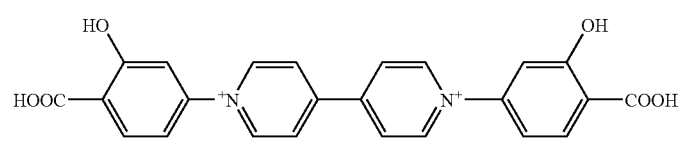

V-5
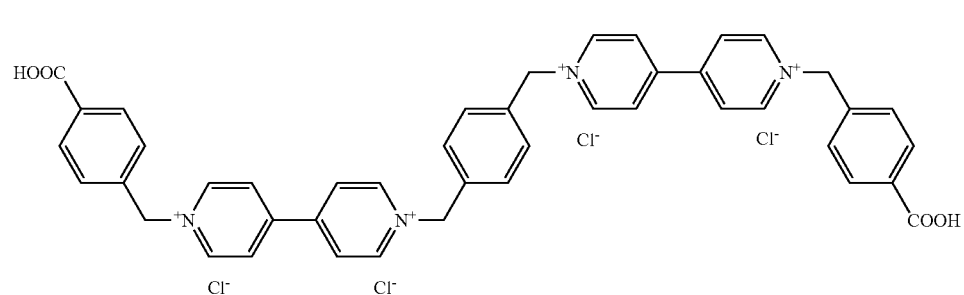

V-6
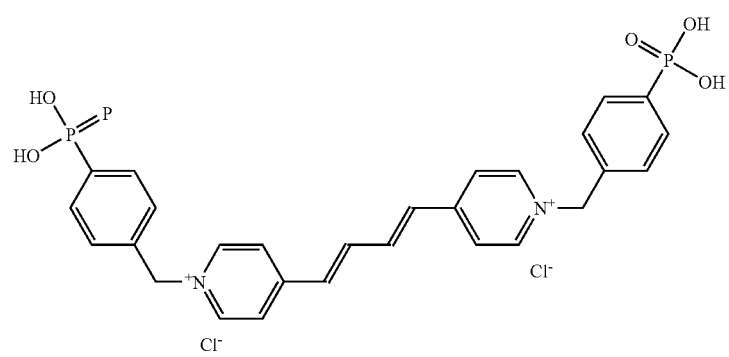

-continued

V-7
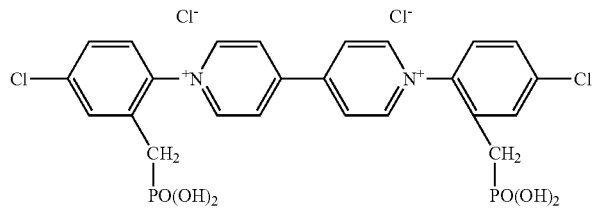

V-8
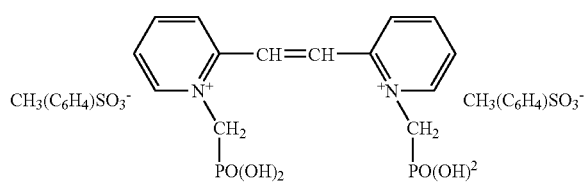

V-9
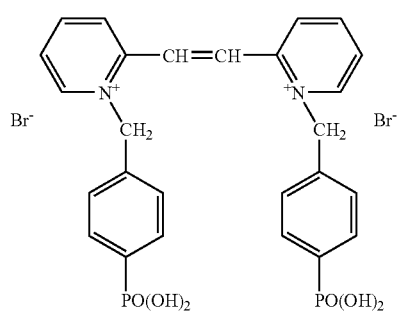

V-10
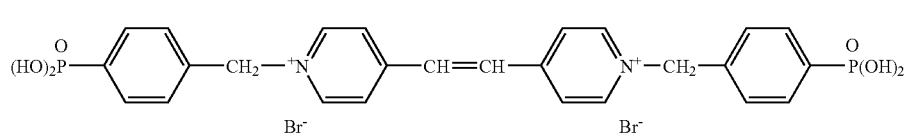

V-11
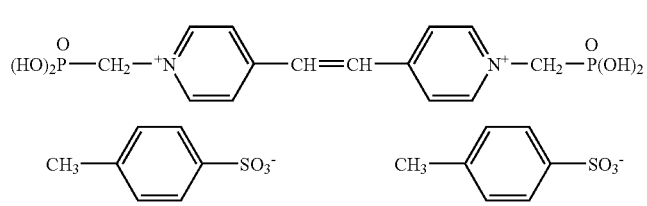

Phenothiazine dyes are compounds typically represented by the structures of following formula (6).

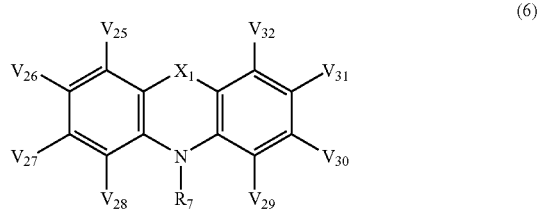

(6)

In formula (6), $V_{25}$, $V_{26}$, $V_{27}$, $V_{28}$, $V_{29}$, $V_{30}$, $V_{31}$ and $V_{32}$ each represents a hydrogen atom or a monovalent substituent, and V's may be connected to each other or may form a ring. Also, they may be connected to $R_7$.

As the monovalent substituent, there illustrated those represented by aforementioned W.

$R_7$ is the same as $R_1$ to $R_6$ in the foregoing formulae (1) to (3), and preferred examples thereof are also the same as with $R_1$ to $R_6$. Also, $R_7$ may be connected to $V_{25}$ to $V_{31}$.

$X_1$ represents a sulfur atom, an oxygen atom, a nitrogen atom (N—Ra), a carbon atom (CVaVb) or a selenium atom, preferably a sulfur atom. Additionally, Ra represents a hydrogen atom, an alkyl group, an aryl group or a hetero ring group, and examples thereof include the same ones as illustrated hereinbefore with $R_1$ to $R_7$, and preferred examples thereof are also the same. Va and Vb each represents a hydrogen atom or a monovalent substituent, and examples thereof include the same ones as illustrated hereinbefore with $V_1$ to $V_{32}$, and preferred examples thereof are also the same.

$M_4$ is included in the formula so that, when necessary for neutralizing the ion charge of the compound, $M_4$ can represent a cation or an anion. Specific examples of $M_4$ are the same as with $M_1$ to $M_3$ in formulae (1) to (3).

$m_4$ represents a number necessary for balancing charge, and is preferably a number of from 0 to 4, more preferably a number of from 0 to 2 and, in the case where a salt is formed within the molecule, it represents 0.

Specific examples of the phenothiazine dye are illustrated below which, however, are not to be construed as limitative.

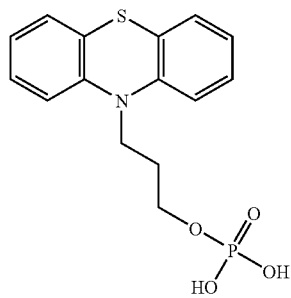

P-1

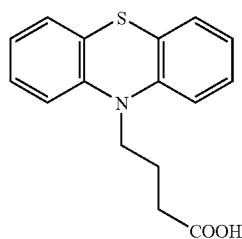

P-2

Styryl dyes are compounds having a fundamental skeleton shown by the following formula (7).

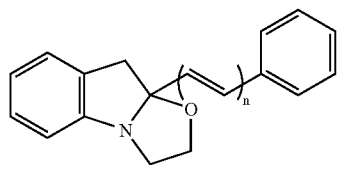

(7)

In the formula, n represents a number of from 1 to 5. This compound may have any substituent at any position in the formula. It is particularly preferred for the compound to have an adsorptive substituent such as a carboxyl group, a sulfonic acid group or a phosphonic acid group. Specific examples thereof are illustrated below which, however, are not to be construed as limitative.

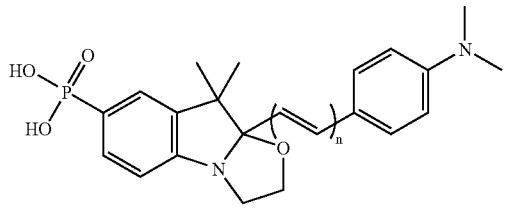

S-1

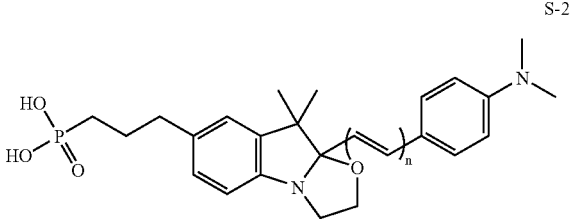

S-2

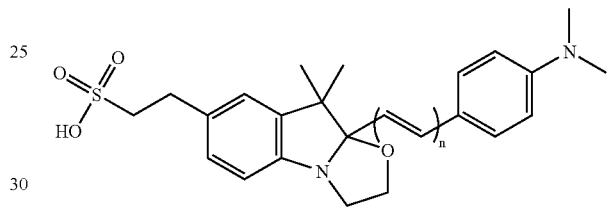

S-3 n in formulae S-1 to S-3 represents an integer of from 1 to 5.

Of these electrochromic materials, organic compounds permit to control an absorption wavelength by changing the substituent. Also, it is preferred to use 2 or more electrochromic materials capable of undergoing the change in optical density to thereby enable the optical density-changing element to undergo the change in optical density at wavelengths different from each other.

In the case of using the optical element of the invention as a light amount control element in, for example, a camera unit, the element preferably has absorption properties of approximately neutral gray which uniformly absorbs an optical light, and the optical density-changing element preferably absorbs a visible light, more preferably a plurality of visible lights different from each other in wavelength, still more preferably a blue light, a green light and a red light. Further, it can be realized by a combination of a plurality of materials which can donate and accept an electron and, as a result of at least one of donating and accepting the electron, undergo the change in absorption spectrum in the wavelength range of 400 to 700 nm. Examples of a preferred combination of two or more materials include viologen dye-phenothiazine dye, viologen dye-ferrocene dye, phthalocyanine dye-Prussian blue, viologen dye-nickel oxide, viologen dye-iridium oxide, tungsten oxide-phenothiazine dye, viologen dye-phenothiazine dye-styryl dye, two viologen dyes (different in substituent)-phenothiazine dye, two viologen dyes (different in substituent)-styryl dye, and two viologen dyes (different in substituent)-nickel oxide.

In order to accelerate electrochemical reaction of these electrochromic materials, a colorless oxidizing or reducing material may exist within the optical density-changing element. The colorless oxidizing or reducing material may exist in a state of adsorbing on one or both of the surface of anode nanoporous semiconductor material and the surface of cathode nanoporous semiconductor material, or may exist in a state of being dissolved in an electrolytic solution.

The colorless oxidizing or reducing material to be adsorbed on the semiconductor nanoporous material is a material having a fundamental structure represented by, for example, the following formula (8):

$(A)_m$—B wherein m represents an integer of from 1 to 4, preferably from 1 to 2 and, when m>2, a plurality of A's is the same or different from each other. In formula (8), A is a moiety for adsorption onto the porous semiconductor nanoporous material, and B is a moiety of at least one of donating and accepting an electron. A is preferably a carboxyl group, a sulfo group, a phosphono group or a phosphate group, particularly preferably a phosphono group or a phosphate group. B is a structure exemplified below.

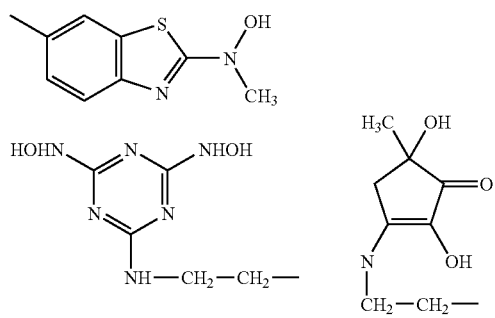

Specific examples of the colorless oxidizing or reducing material include those illustrated below which, however, are not to be construed as limitative.

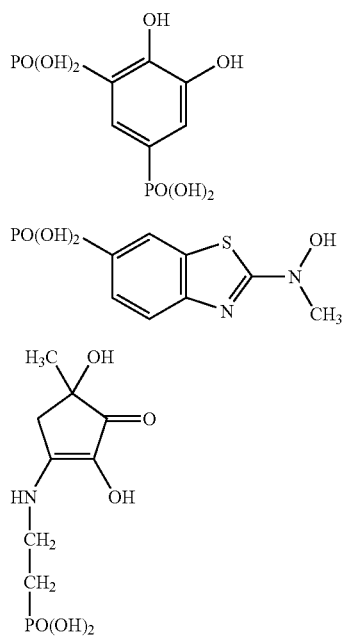

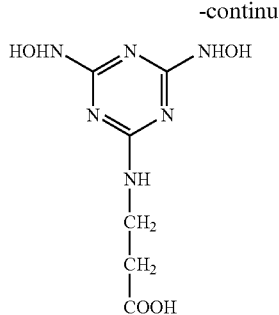

The electrolyte constituting the optical density-changing element comprises a solvent and a supporting electrolyte. Upon at least one of donating and accepting an electron, the supporting electrolyte itself never causes electrochemical reaction, but functions to enhance conductivity. As the solvent, those which have some polarity are preferred, and specific examples thereof include water, an alcohol such as methanol or ethanol, a carboxylic acid such as acetic acid, acetonitrile, propionitrile, glutaronitrile, adiponitrile, methoxyacetonitrile, dimethylacetamide, methylpyrrolidinone, formamide, N,N-dimethylformamide, dimethylsulfoixde, dimethoxyethane, propylene carbonate, ethylene carbonate, γ-butyrolactone, tetrahydrofuran, dioxolan, sulfolane, trimethyl phosphate, pyridine, hexamethylenoic acid triamide and polyethylene glycol.

The supporting electrolyte functions as a charge carrier in the form of ion in the solvent, and is a salt comprising a combination of easily ionizable anion and cation. Examples of cation include a metal ion typically represented by $Li^+$, $Na^+$, $K^+$, $Rb^+$ and $Cs^+$ and a quaternary ammonium ion typically represented by tetrabutylammonium ion. Examples of anion include a halide ion typically represented by $Cl^-$, $Br^-$, $I^-$ and $F^-$, sulfate ion, nitrate ion, perchlorate ion, tosylate ion, tetrafluoroborate ion and hexafluorophosphate ion. Other examples of the electrolyte include molten salts typically represented by LiCl/KCl, solid electrolytes typically represented by an ionic conductor and a superionic conductor and solid high molecular electrolytes typically represented by a film-shaped ion-conductive substance such as ion-exchange membrane.

As the optical element of the invention, it is preferred to control the optical density at 400 nm in λ of the element in a bleached state to be 0.2 or less, (preferably 0.125 or less) by appropriately combining the materials of the optical density-changing element, i.e., by optimizing the kinds of support, electrically conductive layer and electrochromic material or optimizing the kinds or particle size of the semiconductor materials. Also, it is preferred to control all of the average value of optical density of the element in a bleached state in the range of from 400 nm to 500 nm in λ, the average value of optical density of the element in a bleached state in the range of from 500 nm to 600 nm in λ, and the average value of optical density of the element in a bleached state in the range of from 600 nm to 700 nm in λ to be 0.1 or less in the same manner as mentioned above. On the other hand, the average value of the optical density in the range of from 400 to 700 in λ upon response to irradiation with electromagnetic wave is preferably 0.5 or more, more preferably 0.8 or more, particularly preferably 0.95 or more.

Also, the optical element permits to shorten the response time for the change in optical density upon irradiation with the electromagnetic wave to a "sub-second order" level by appropriately combining the materials for the optical density-changing element, particularly by optimizing the kinds and particle size of the semiconductor materials as described above. The term "response time for the change in optical density upon irradiation with the electromagnetic wave" as used herein means the time required, in the case of irradiating with an electromagnetic wave, for the optical density to reach an intermediate optical density from starting from the initiation of the irradiation, the intermediate optical density being an optical density between the optical density before irradiation (minimum optical density) and the saturated optical density after irradiation (maximum optical density); or in the case of shielding the electromagnetic wave, for the optical density to reach an intermediate optical density from starting from the initiation of the shielding, the intermediate optical density being an optical density between the maximal optical density and the minimal optical density. In both cases, the invention can realize a response time of preferably within 5 seconds, more preferably within 2 seconds, still more preferably within 0.3 second.

In the optical element of the invention, the voltage to be applied upon increasing the optical density of the optical density-changing element should be selected depending upon the end-use or application of the element. The higher the applied voltage, the more accelerated is the coloration. However, durability of the optical density-changing element can be damaged due to side reactions. The voltage to be applied for coloration is preferably 1 V or more, particularly preferably from 1.5 V to 4 V.

In the optical element of the invention, the optical density-changing element and the electromotive force-generating element may be connected to each other either directly or through a circuit having the function of amplification or protection. Also, a circuit constitution may be employed wherein a resistor is provided in parallel with the optical density-changing element so as to accelerate disappearance of the applied voltage upon shielding of light.

The optical element of the invention may be applied to any of materials for vehicle window, display devices and camera-related optical elements. One example of application of the optical element of the invention for the element to exhibit its effectiveness is a camera-related optical element. The element is effective for any of camera units such as a large-sized or middle-sized camera, a single-lens reflex camera, a compact camera, a film-with-lens unit, a digital camera, a camera for broadcasting, a movie film camera, a digital camera for movies, a camera unit for mobile phone and an 8-mm movie camera. An example permitting to exhibit the feature of the invention is a simple photographic system not requiring complicated control mechanisms, represented by a film-with-lens unit. Other examples permitting to exhibit the feature include a digital camera having CCD or CMOS as an imaging device. The element can compensate for the narrow dynamic range of the imaging device.

In the case of applying the optical element of the invention to a camera unit, the optical density-changing element is preferably provided on the optical axis of the lens. Also, the larger the overlap between the optical absorption properties (for example, light absorption wavelength and spectral sensitivity) of the electromotive force-generating element and that of the optical density-changing element and a light-sensitive element of a camera (for example, a light-sensitive material or CCD), the more preferred. In particular, the larger the overlap between the absorption wavelength region of the optical density-changing element and the spectral sensitivity region of the light-sensitive element in a camera, the more preferred. Thus, a neutral gray light amount control can be realized over the whole spectral sensitivity region of the camera.

The invention is described in detail by reference to the following examples which, however, are not to be construed as limiting the invention.

EXAMPLE 1

An electrochromic type optical density-changing element of the invention is described below. Its specific form is as shown in FIG. 1.

(1) Preparation of Sample 101 (Example)

Sample 101 (Example) was prepared in the order of (i) preparation of a nanoporous tin oxide electrode for cathode, (ii) preparation of a nanoporous tin oxide electrode for anode, (iii) adsorption of a chromic dye and (iv) assembly of an electrochromic element.

(i) Preparation of a Nanoporous Tin Oxide Electrode for Cathode:

Polyethylene glycol (molecular weight: 20,000) was added to an aqueous dispersion of tin oxide having a diameter of about 40 nm, and the mixture was uniformly stirred to prepare a coating solution. As a coating plate, a 0.7-mm thick electrically conductive glass having coated thereon a conductive $SnO_2$-evaporated thin film was used. Additionally, an antireflective film was provided on the opposite side of the transparent conductive glass to the conductive film-deposited side. On the conductive $SnO_2$ film of this transparent conductive glass was uniformly coated the coating solution in such amount that tin oxide amount became 9 g/m². After the coating, the thus-coated transparent conductive glass plate was baked at 450° C. for 30 minutes to remove the high molecular compound to thereby obtain a nanoporous tin oxide electrode. The thus-prepared electrode had a surface roughness coefficient of about 750.

(ii) Preparation of Nanoporous Tin Oxide Electrode for Anode:

Polyethylene glycol (molecular weight: 20,000) was added to an aqueous dispersion of tin oxide having a diameter of about 5 nm, and the mixture was uniformly stirred to prepare a coating solution. As a coating plate, a 0.7-mm thick electrically conductive glass having coated thereon a conductive $SnO_2$-evaporated thin film was used. Additionally, an antireflective film was provided on the opposite side of the transparent conductive glass to the conductive film-deposited side. On the conductive $SnO_2$ film of this transparent conductive glass was uniformly coated the coating solution. After the coating, the thus-coated transparent conductive glass plate was heated to 450° C. in 100 minutes, and baked at 450° C. for 30 minutes to remove the high molecular compound. The coating and baking were repeated till the amount of coated tin oxide became 7 g/m² to thereby obtain a nanoporous tin oxide electrode. The thus-prepared electrode had a surface roughness coefficient of abut 750.

(iii) Adsorption of Electrochromic Material:

As the electrochromic material, electrochromic materials (V-1) and (P-1) shown below were used. Electrochromic material V-1 has the property of being colored upon being reduced, and electrochromic material P-1 has the property of being colored upon being oxidized. Additionally, electrochromic materials V-1 and P-1 are different from each other in the spectral absorption spectrum in a colored state. That is, when colored, the two electrochromic materials undergo the change in optical density at a different wavelength.

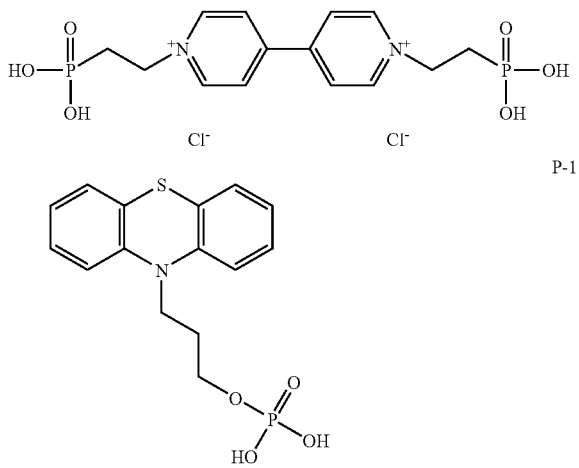

V-1 was dissolved in water, and P-1 was dissolved in a mixed solvent of methanol and chloroform, both in a concentration of 0.02 ml/l. The nanoporous tin oxide electrode prepared in (i) was dipped in the V-1 solution, and the nanoporous tin oxide electrode prepared in (ii) was dipped in the P-1 solution, both at 40° C. for 3 hours to thereby adsorb each electrochromic material onto each corresponding nanoposous tin oxide material. After dipping, the nanoporous tin oxide electrodes were washed with respective solvents, then dried in vacuo.

Figure 4:
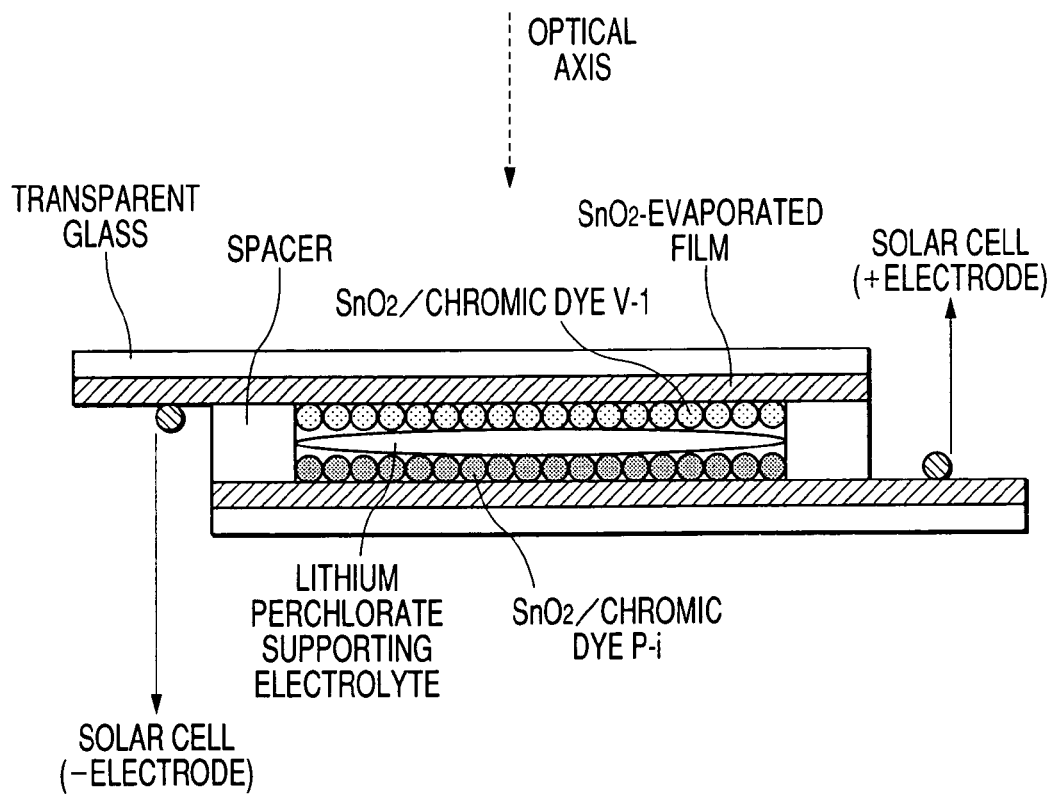
FIG. 4 is a schematic cross-sectional view showing the constitution of one example (light amount control filter) of the optical density-changing element of the invention.

(iv) Assembly of Electrochromic Element:

The nanoporous tin oxide electrode having adsorbed thereon V-1 material was faced with the nanoporous tin oxide electrode having adsorbed thereon P-1 material as shown in FIG. 4, and a 0.2 mol/l solution of lithium perchlorate in γ-butyrolactone was enclosed in the gap between the two electrodes to assemble electrochromic element sample 101. The sample 101 was colored by connecting the tin oxide nanoporous electrode having adsorbed thereon V-1 dye to (−) electrode and connecting the tin oxide porous electrode having adsorbed thereon P-1 dye to (+) electrode. Also, the sample 101 was bleached by short-circuiting the two electrodes.

Sample 102 was prepared in the same manner as with the sample 101 except for changing the nanoporous semiconductor material as shown in Table 1. Additionally, samples wherein Fbc and Er satisfy the relation of −0.3≦Fbc−Er≦1.3 were rated as "O", and samples not satisfying the relation as "x", and samples wherein Fba and Eo satisfy the relation of −1.3≦Fba−Eo≦0.3 were rated as "O", and samples not satisfying the relation as "x".

TABLE 1

| Sample No. | Chromic Material on Cathode Side/ Nanoporous Material on Cathode Side | Fbc − Er (V) | Chromic Material on Anode Side/ Nanoporous Material on Anode Side | Fba − Eo (V) |
| --- | --- | --- | --- | --- |
| Sample 101 (present invention) | V-1/SnO$_2$ | 0.25 (o) | P-1/SnO$_2$ | −0.15 (o) |

TABLE 1-continued

| Sample No. | Chromic Material on Cathode Side/ Nanoporous Material on Cathode Side | Fbc − Er (V) | Chromic Material on Anode Side/ Nanoporous Material on Anode Side | Fba − Eo (V) |
| --- | --- | --- | --- | --- |
| Sample 102 (comparative example) | V-1/SnO$_2$ | 0.25 (o) | P-1/Ta$_2$O$_5$ | −2.0 (x) |

Subsequently, properties of the sample 101 (present invention) and the sample 102 (comparative example) were examined. When a voltage of 1.5 V was applied to the sample 101 (present invention), an optical density at 515 nm increased by 0.9 within 30 seconds. Subsequently, the two electrodes were short-circuited, and the color was completely bleached within 20 seconds. On the other hand, when a voltage of 1.5 V was applied to the sample 102 (comparative example), an optical density at 515 nm increased by 0.6 after 30 seconds. Also, even when the two electrodes were short-circuited, it took 1 minute or longer for the color to be completely bleached. Additionally, as to bleaching speed, samples being bleached within 30 seconds were rated as "O", and samples not being bleached within 30 seconds were rated as "x". A larger increment of the optical density (Δoptical density) and a faster bleaching are preferred. The results thus obtained are tabulated in the following Table 2. The term "bleaching speed" as used herein means a response speed upon bleaching.

TABLE 2

| | Constitution of Electrochromic Element | | Performance of Electreochromic Element | |
| --- | --- | --- | --- | --- |
| | Cathode | Anode | ΔOptical Density | Bleaching Speed |
| Sample 101 (present invention) | o | o | 0.95 | o |
| Sample 102 (comparative example) | o | x | 0.60 | x |

As is shown in Table 2, the sample 101 (present invention) showing the potentials satisfying the relation of the invention showed better performance than that of the sample 102 (comparative example) showing the potentials not satisfying the relation.

EXAMPLE 2

Sample 201 (present invention) and sample 202 (comparative example) as shown in Table 3, were prepared.

TABLE 3

| Sample No. | Chromic Material on Cathode Side/ Nanoporous Material on Cathode Side | Fbc − Er (V) | Chromic Material on Anode Side/ Nanoporous Material on Anode Side | Fba − Eo (V) |
| --- | --- | --- | --- | --- |
| Sample 201 (present invention) | V-1/ZnO | 0.3 (o) | P-1/SnO$_2$ | −0.15 (o) |

TABLE 3-continued

| Sample No. | Chromic Material on Cathode Side/ Nanoporous Material on Cathode Side | Fbc − Er (V) | Chromic Material on Anode Side/ Nanoporous Material on Anode Side | Fba − Eo (V) |
|---|---|---|---|---|
| Sample 202 (comparative example) | V-1/V$_2$O$_5$ | 1.6 (x) | P-1/SnO$_2$ | −0.15 (o) |

Properties of the sample 201 (present invention) and the sample 202 (comparative example) were examined. When a voltage of 1.5 V was applied to the sample 201 (present invention), an optical density at 610 nm increased by 1.0 within 30 seconds. Subsequently, the two electrodes were short-circuited, and the color was completely bleached within 20 seconds. On the other hand, when a voltage of 1.5 V was applied to the sample 202 (comparative example), an optical density at 610 nm increased by 0.5 after 30 seconds. Also, even when the two electrodes were short-circuited, it took 1minute or longer for the color to be completely bleached. The results thus obtained are tabulated in the following Table 4.

TABLE 4

| | Constitution of Electrochromic Element | | Performance of Electreochromic Element | |
|---|---|---|---|---|
| | Cathode | Anode | ΔOptical Density | Bleaching Speed |
| Sample 201 (present invention) | o | o | 1.0 | o |
| Sample 202 (comparative example) | x | o | 0.50 | x |

As is shown in Table 4, the sample 201 (present invention) showing the potentials satisfying the relation of the invention showed better performance than that of the sample 202 (comparative example) showing the potentials not satisfying the relation.

EXAMPLE 3

Sample 301 (present invention) and sample 302 (comparative example) as shown in Table 5 were prepared.

TABLE 5

| Sample No. | Chromic Material on Cathode Side/ Nanoporous Material on Cathode Side | Fbc − Er (V) | Chromic Material on Anode Side/ Nanoporous Material on Anode Side | Fba − Eo (V) |
|---|---|---|---|---|
| Sample 301 (present invention) | V-1/SrTiO$_3$ | 0.3 (o) | P-1/SnO$_2$ | −0.15 (o) |
| Sample 302 (comparative example) | V-1/ZrO$_2$ | −1.0 (x) | P-1/SnO$_2$ | −0.15 (o) |

Properties of the sample 301 (present invention) and the sample 302 (comparative example) were examined. When a voltage of 1.5 V was applied to the sample 301 (present invention), an optical density at 610 nm increased by 1.0 within 30 seconds. Subsequently, the two electrodes were short-circuited, and the color was completely bleached within 20 seconds. This is favor (rated as "O") in view of controlling the electrochromic element. On the other hand, the sample 302 (comparative example) was colored even when no voltage was applied thereto, and an optical density at 610 nm increased. This is not favored (rated as "x") in view of controlling the electrochromic element. The results thus obtained are tabulated in the following Table 6.

TABLE 6

| | Constitution of Electrochromic Element | | Performance of Electreochromic Element |
|---|---|---|---|
| | Cathode | Anode | Controllability |
| Sample 301 (present invention) | o | o | o |
| Sample 302 (comparative example) | x | o | x |

As is shown in Table 6, the sample 301 (present invention) showing the potentials satisfying the relation of the invention showed better performance than that of the sample 302 (comparative example) showing the potentials not satisfying the relation.

EXAMPLE 4

Sample 401 (present invention) and sample 402 (present invention) as shown in Table 7 were prepared. Samples having potentials satisfying the relation of the invention were rated as "O" and samples having potentials not satisfying the relation of the invention were rated as "x".

TABLE 7

| Sample No. | Chromic Material on Cathode Side/ Nanoporous Material on Cathode Side | Fbc − Er (V) | Chromic Material on Anode Side/ Nanoporous Material on Anode Side | Fba − Eo (V) |
|---|---|---|---|---|
| Sample 401 (present invention) | V-1/SnO$_2$ | o | P-1/SnO$_2$ | o |
| Sample 402 (comparative example) | V-1/SnO$_2$ V-8/SnO$_2$ | o | P-1/SnO$_2$ | o |

Properties of the sample 401 (present invention) and the sample 402 (present invention) were examined. When a voltage of 1.5 V was applied to both of the sample 401 (present invention) and the sample 402 (present invention), an optical density increased by 0.90 within 30 seconds and, when the two electrodes were short-circuited, the color was completely bleached within 20 seconds, provided that the sample 401 (present invention) and the sample 402 (present invention) differed from each other in hue in the colored state. Specifically, color of the sample 401 (present invention) was deep blue, whereas color of the sample 402 (present invention) was gray. It is seen from the above results that, in the case of adsorbing two kinds of electrochromic materials, too, excellent performance can be obtained as long as the relations of the invention with respect to the electric potential are satisfied.

EXAMPLE 5

Sample 501 (present invention) and sample 502 (comparative example) as shown in Table 8 were prepared.

TABLE 8

| Sample No. | Oxidization or Reducing Material on Cathode Side/ Nanoporous Material on Cathode Side | Fbc − Er (V) | Chromic Material on Anode Side/ Nanoporous Material on Anode Side | Fba − Eo (V) |
|---|---|---|---|---|
| Sample 501 (present invention) | R-2/SnO$_2$ | ○ | P-1/SnO$_2$ | ○ |
| Sample 502 (comparative example) | R-2/ZrO$_2$ | x | P-1/SnO$_2$ | ○ |

Subsequently, properties of the sample 501 (present invention) and the sample 502 (comparative example) were examined. When a voltage of 1.5 V at 515 nm was applied to the sample 501 (present invention), an optical density at 515 nm increased by 0.9 within 30 seconds. Subsequently, the two electrodes were short-circuited, and the color was completely bleached within 20 seconds. On the other hand, when a voltage of 1.5 V was applied to the sample 502 (comparative example), an optical density at 515 nm increased by 0.6 after 30 seconds. Also, even when the two electrodes were short-circuited, it took 1 minute or longer for the color to be completely bleached. The results thus obtained are tabulated in the following Table 9.

TABLE 9

| | Constitution of Electrochromic Element | | Performance of Electreochromic Element | |
|---|---|---|---|---|
| | Cathode | Anode | ΔOptical Density | Bleaching Speed |
| Sample 501 (present invention) | ○ | ○ | 0.90 | ○ |
| Sample 502 (comparative example) | x | ○ | 0.60 | x |

As is shown in Table 9, the sample 501 (present invention) showing the potentials satisfying the relation of the invention showed better performance than that of the sample 502 (comparative example) showing the potentials not satisfying the relation.

EXAMPLE 6

An example of mounting the optical element of the invention on a film-with-lens unit is shown below.

Figure 2:
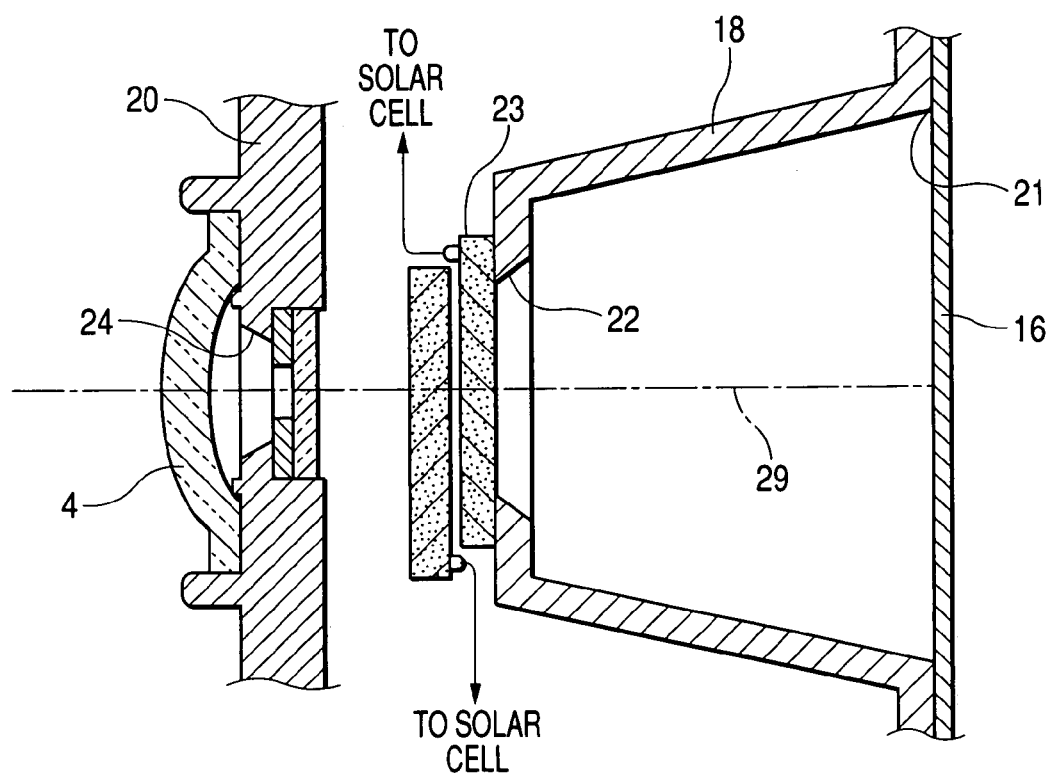
FIG. 2 is a schematic cross-sectional view showing essential parts of a film-with-lens unit having the optical element of the invention.
Figure 3:
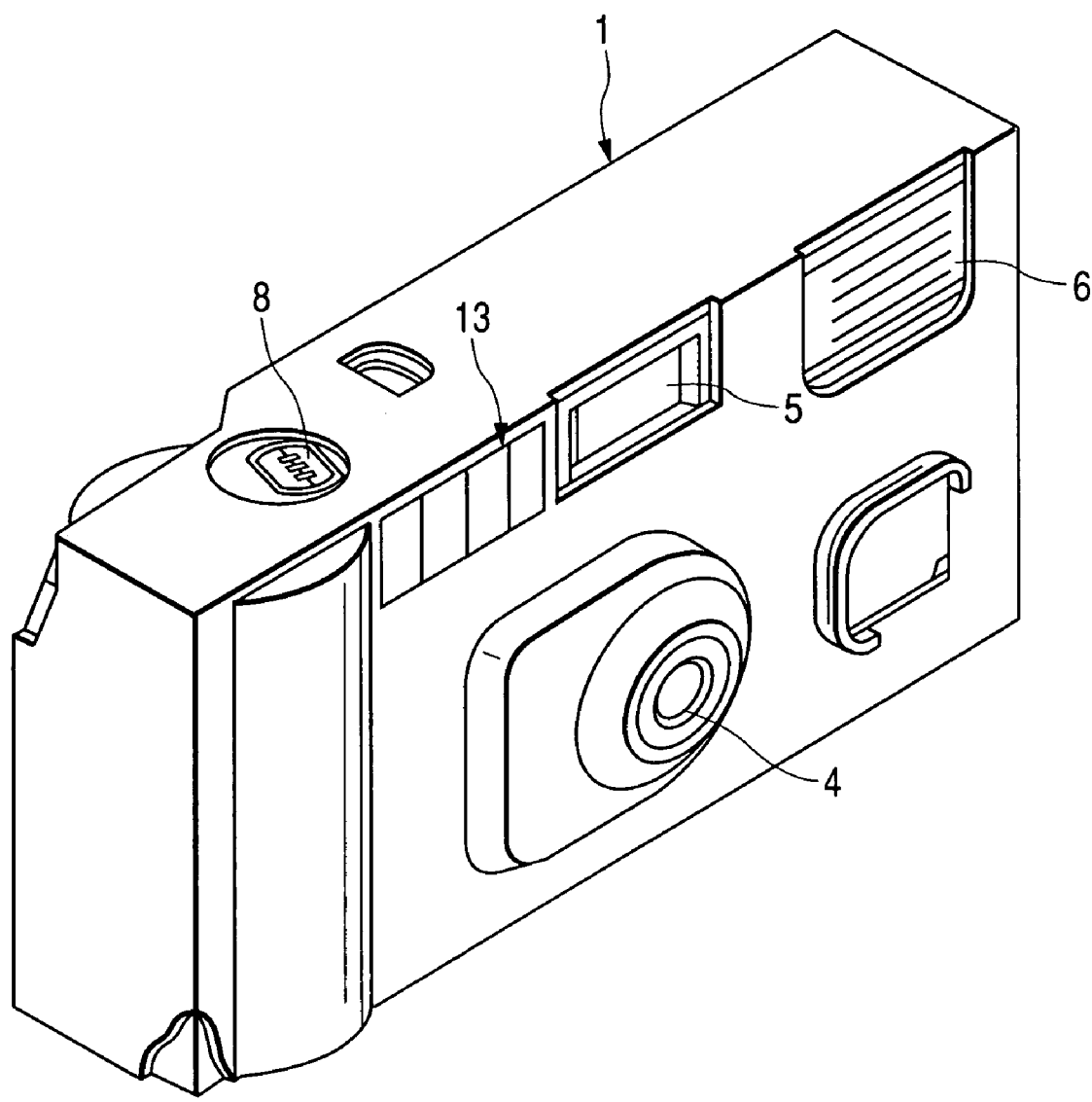
FIG. 3 is a perspective view of one example of a film-with-lens unit having the optical element of the invention.

As is shown in FIGS. 2 and 3, a film-with-lens unit of the example has mounted thereon (1) light amount control filter 23 (optical density-changing element) and (2) solar cell 13 (electromotive force-generating element). The solar cell 13 provided outside of the unit permits to prevent overexposure under high luminance environment by generating electromotive force in response to the intensity of outer light, and controlling the amount of light reaching the photographic film through the light amount control filter 23 in response to the electromotive force.

(1) Light Amount Control Filter

In this Example, sample 402 prepared in Example 4 was used as a light amount control filter. In connecting to the solar cell, the tin oxide electrode having adsorbed thereon V-1 dye was connected to (−) electrode of the solar cell, and the tin oxide electrode having adsorbed thereon P-1 dye was connected to (+) electrode of the solar cell.

(2) Solar Cell

Figure 5:
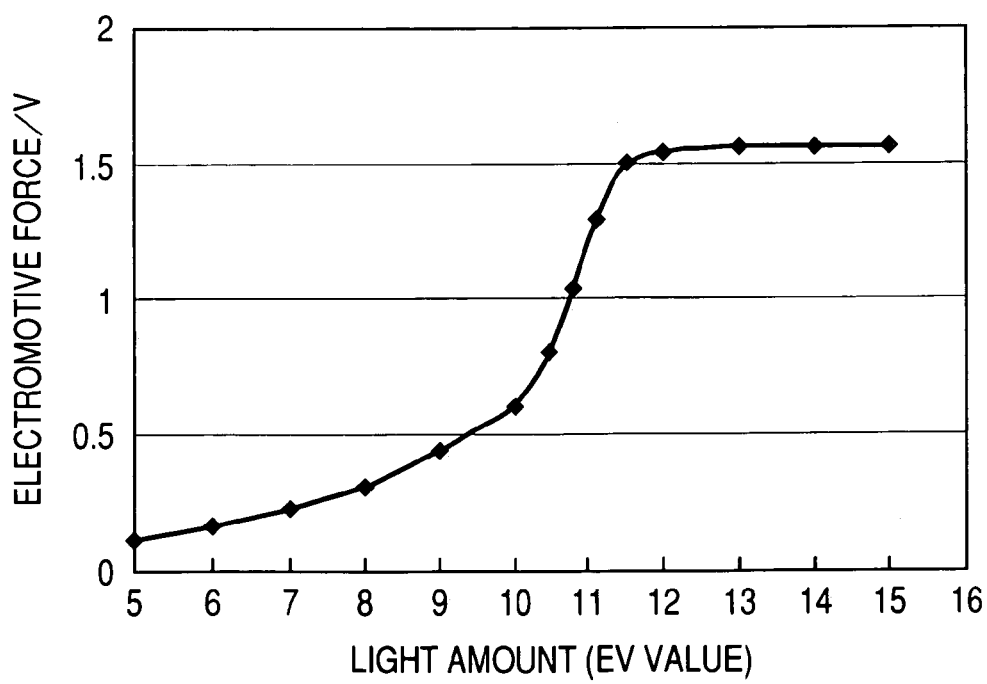
FIG. 5 is a graph showing electromotive force response characteristics of the solar cell used in Example 6.

As the solar cell, silicon type SS-3012DS (manufactured by SINONAR) was used. Unit cells of the solar cell were connected in series so as to generate an electromotive force of about 1.5 V. Electromotive force characteristics of the used solar cell against the amount of pseudo sunlight (xenon lamp; manufactured by Oriel; using AM 1.5 spectral filter) are shown in FIG. 5.

A film-with-lens unit having the constitution shown in the following Table 10 was prepared by using the above-mentioned (1) light amount control filter and (2) solar cell. ISO speed of the used film was 1600, aperture was F8, and shutter speed was 1/85". In the case of using a photographic system constituted under such conditions, a photographic negative with an optimal density can be obtained by photographing under the condition of EV=8.4.

TABLE 10

| Sample | Solar Cell | Light Amount Control Cell |
|---|---|---|
| 601 (Comparative example) | not used | not used |
| 602 (present invention) | used | used |

Figure 6:
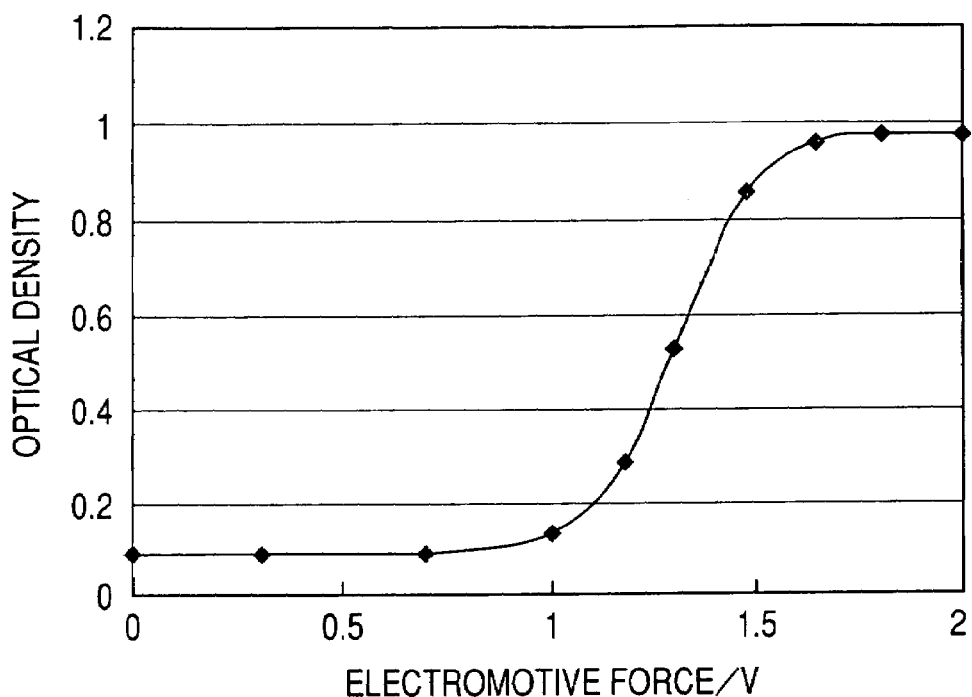
FIG. 6 is a graph showing electromotive force response characteristics of the light amount control filter used in Example 6.
Figure 7:
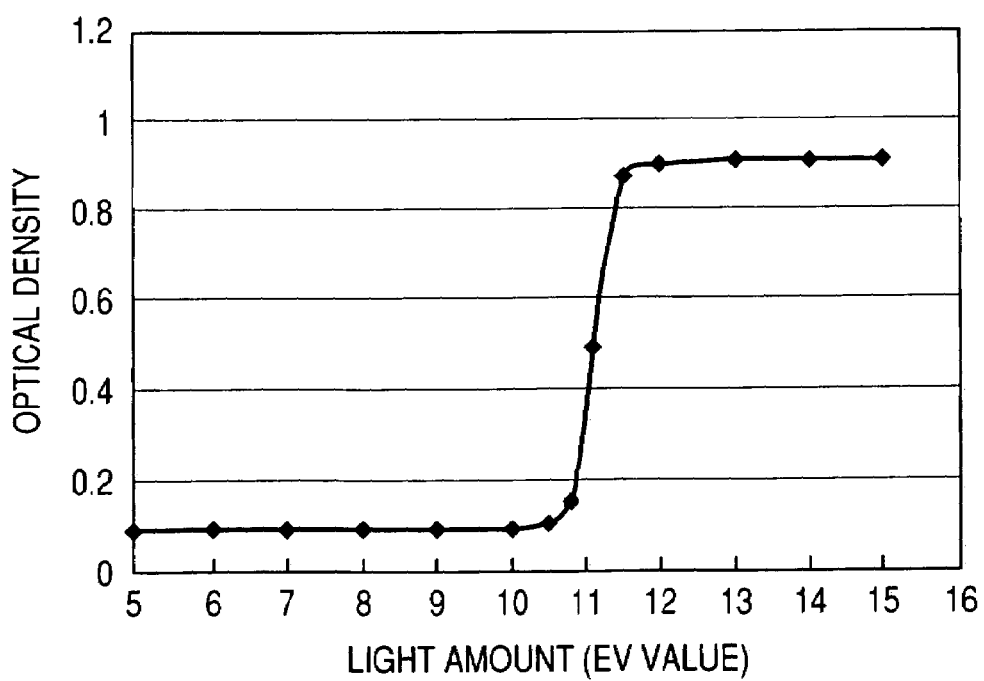
FIG. 7 is a graph showing electromotive force response characteristics of the optical element of the invention used in Example 6.

The optical density characteristics against the electromotive force of the solar cell in the optical element used for the sample 602 are shown in FIG. 6. Also, the optical density response characteristics against the light amount of the optical element wherein the solar cell is connected to the light amount control filter obtained from the above results are shown in FIG. 7. Additionally, the optical density as shown here is an average value in the range of from 400 nm to 700 nm in λ. Additionally, to increase the aperture by +1 corresponds to reduction of the amount of transmitted light to a half level, and corresponds to an increase by 0.3 in terms of optical density. As is shown in FIG. 7, the aperture of this optical element is +0.3 upon shielding light and, when a light of 11.5 in EV is irradiated, the aperture increased to +2.9 and, when a light of 12.0 or more in EV is irradiated, the aperture increased to +3.0. The response time for the change was 5 seconds. Additionally, the term "EV" as used herein means a value which shows brightness and is calculated by the following relation:

$$EV=\log_2(L/2.4)$$

wherein L represents brightness in terms of the practical unit for illuminance of lux.

To mention in relation to the aperture, an increase in aperture of an optical element by +1 corresponds to reduction of the brightness of light received through the optical element, EV value, by 1.

Scenes of from EV=6.4 (corresponding to dark room) to EV=15.4 (corresponding to midsummer fine weather) using the above-mentioned units 601 and 602, followed by CN-16 development processing (Fuji Photo Film Co., Ltd.) for 3 minutes and 15 seconds. Comparison of exposure level of the resulting photographic negatives is shown in Table 11. Additionally, the term "exposure level" as used herein means that obtained by evaluating properness of the density of the processed photographic negative, taking the density of optimal photographic negative as 0. In the case of the photographic system used here as mentioned above, a photographic negative with the optimal density can be obtained by photographing under the condition of EV=8.4. That is, the exposure level=0. The term "exposure level +1" as used herein means that the density is darker than the proper gray density by one aperture unit (=0.3 higher in terms of optical density), and the term "exposure level −1" as used herein means that the density is brighter than the proper gray density by one aperture unit (0.3 lower in terms of optical density).

EXAMPLE 7

Figure 8:
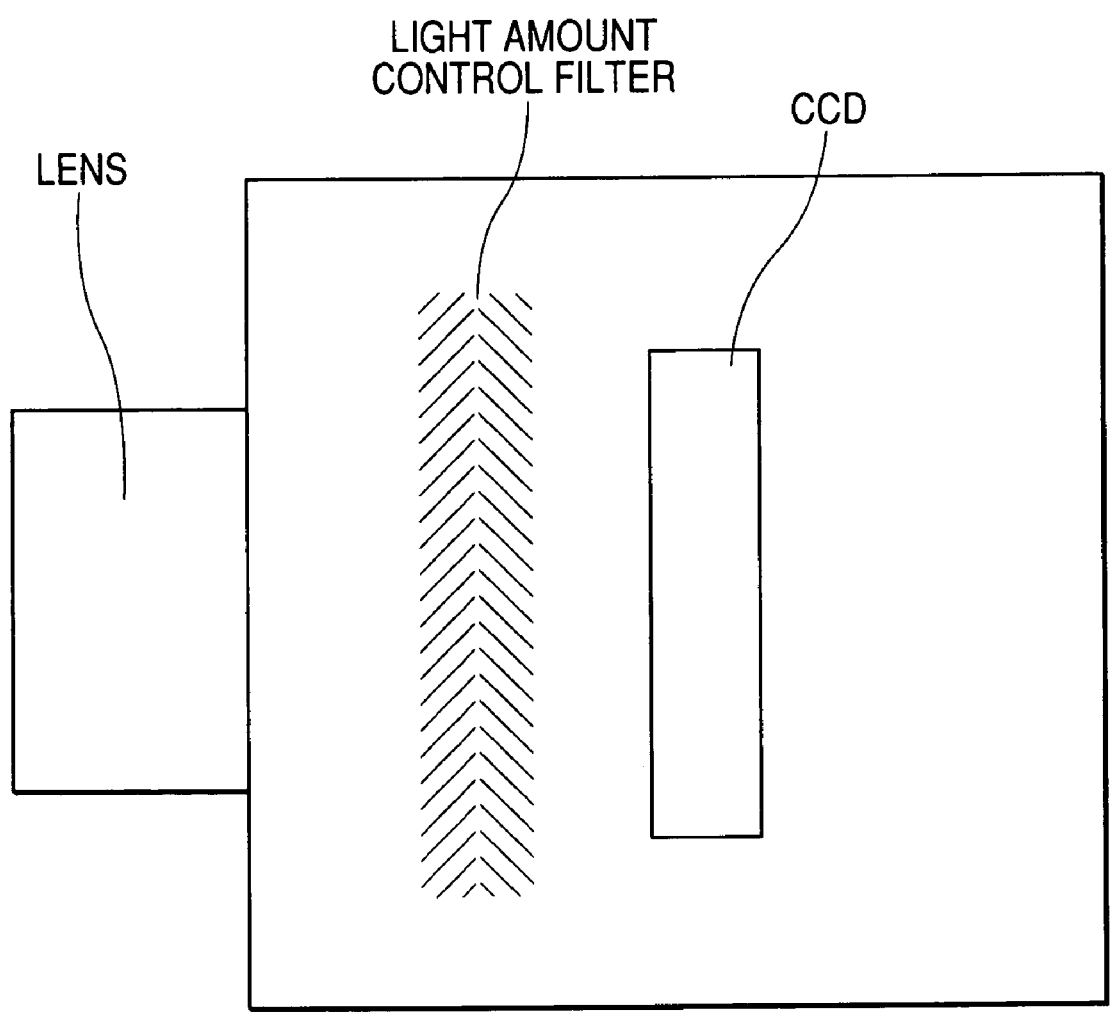
FIG. 8 is a schematic cross-sectional view showing essential parts of an electronic still camera having the optical element of the invention.
Figure 9:
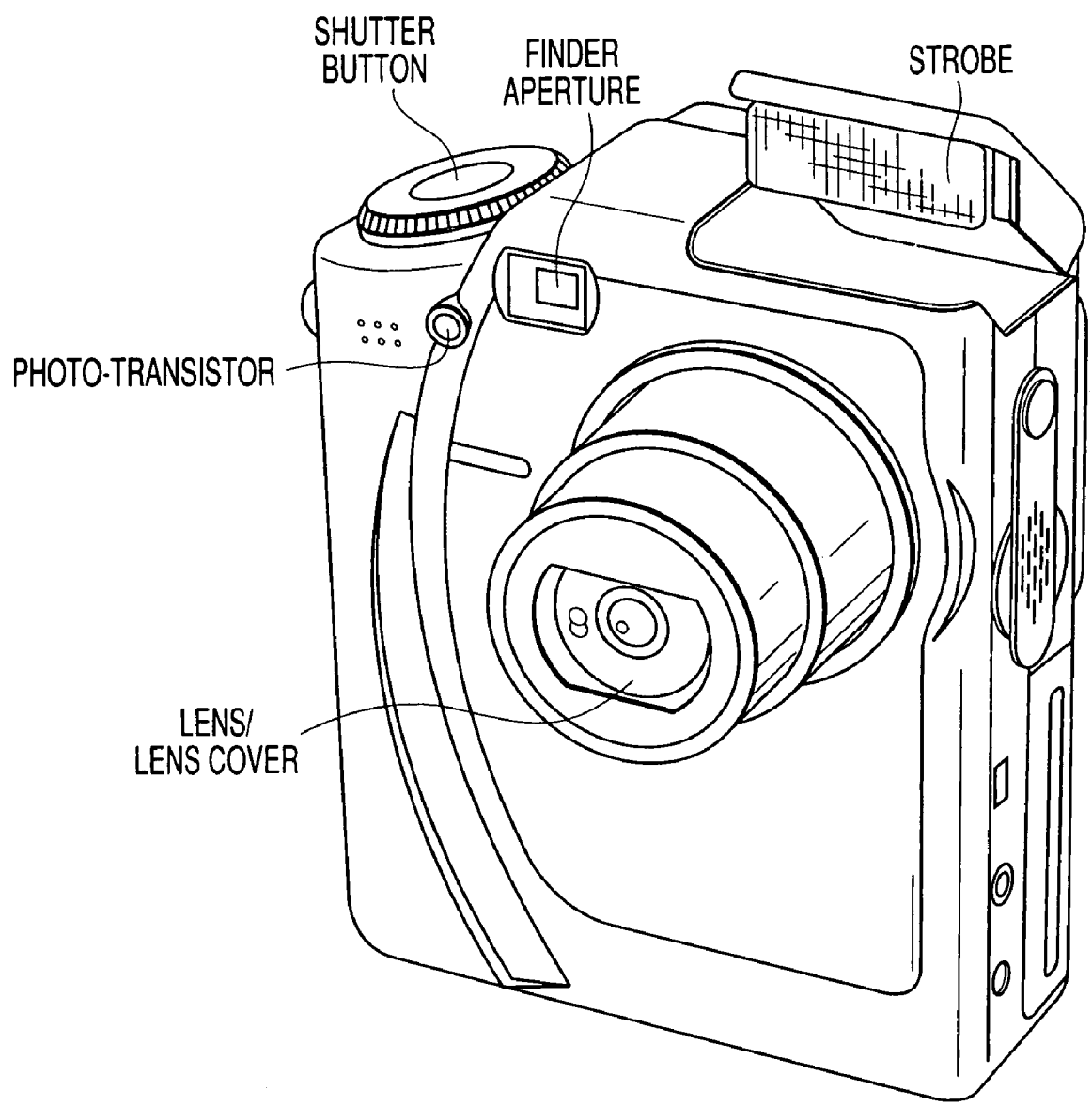
FIG. 9 is a schematic perspective view showing one example of an electronic still camera having the optical element of the invention.

This example is an example wherein a light amount control filter is mounted on an electronic camera. As shown in FIG. 8, an electronic still camera of the invention had, as a light amount control filter, the sample 402 prepared in Example 4 between a lens and CCD. Further, as shown in FIG. 9, a photo-transistor (PT380 manufactured by Sharp Co., Ltd.) was provided in the housing, and a cell contained in the electronic still camera was connected as an electric source so as to control the light amount control filter. The same comparative experiment as with the film-with-lens unit of Example 6 was conducted using the electronic still camera, and it was found that electronic still cameras having a narrow dynamic range exhibited a more remarkable light amount-controlling effect than with the film-with-lens unit.

TABLE 11

| Sample No. | Photographing Condition | | | | | | | | | |
|---|---|---|---|---|---|---|---|---|---|---|
| | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 601 (Comparative Example) | −2.0 | −1.0 | 0 | +1.0 | +2.0 | +3.0 | +4.0 | +5.0 | +6.0 | +7.0 |
| 602 (present invention) | −2.2 | −1.2 | −0.2 | +0.8 | +1.8 | +0.0 | +0.8 | +1.8 | +2.8 | +3.8 |

In the case of printing using the thus-obtained photographic negative, a certain measure of deviation of exposure level can be corrected. Specifically, a photographic negative of from −1 to +4 in exposure level can be corrected upon printing, and a "successful photograph" can be obtained. In case where exposure level is not within the above-mentioned range, correction upon printing is not enough, resulting in "unsuccessful photograph". Results of whether photographs obtained by printing from the photographic negatives obtained under the above-mentioned conditions was successful or unsuccessful are tabulated in Table 12. In Table 12, "o" represents successful photographs, and "x" represents unsuccessful photographs.

EXAMPLE 8

This example is an example wherein a light amount control filter is used in a photographic unit for use in a mobile phone. A light amount control filter prepared in the same manner as in Example 1 was mounted on a lens of a photographic unit in a mobile phone and, further, a photo-transistor (PT380 manufactured by Sharp Co., Ltd.) was provided around the photographic unit, and a cell contained in the mobile phone was connected as an electric source so as to control the light amount control filter. It was found that the mobile phone having the unit of this Example permitted

TABLE 12

| Sample No. | Photographing Condition | | | | | | | | | |
|---|---|---|---|---|---|---|---|---|---|---|
| | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 601 (Comparative Example) | x | o | o | o | o | o | o | x | x | X |
| 602 (present invention) | x | x | o | o | o | o | o | o | o | o |

It is seen from Table 12 that, in comparison with the comparative sample not having a light amount control system, the sample 602 of the invention having a light amount control system has a greatly enlarged photographable region under the condition of high illuminance (EV value being large) though a photographable region under the condition of low illuminance (EV value being small) is narrowed to some extent. Thus, a camera system having an overall broad photographable region is realized.

photographing under a wider exposure condition than with a photographic unit not having the optical element as in the invention.

EXAMPLE 9

An example of mounting the optical element of the invention on a film-with-lens unit is shown below.

As shown in FIGS. 2 and 3, the film-with-lens unit of this Example has mounted thereon (1) light amount control filter 23 (optical density-changing element) and (2) solar cell 13 (electromotive force-generating element). The solar cell 13 provided outside of the unit permits to prevent overexposure under high luminance environment by generating electromotive force in response to the intensity of outer light and controlling the amount of light reaching the photographic film 16 through the light amount control filter 23 in response to the electromotive force. Next, details on (1) light amount control filter and (2) solar cell and methods for preparing them are described.

(1) Light Amount Control Filter

The light amount control filter was prepared in the order of (i) formation of titanium oxide nanoparticles, (ii) coating of the titanium oxide nanoparticles, (iii) adsorption of a chromic dye, and (iv) forming a filter element.

(i) Preparation of Titanium Oxide Nanoparticles:

78.8 ml (0.27 mol) of titanium tetraisopropoxide was added to an acidic solution prepared by adding 8 ml of concentrated nitric acid to 440 ml of water and, after stirring, the mixture was aged at 95° C. for 3 hours. After the aging, the mixture became a sol liquid. X-ray diffractometry revealed that the particles in the sol liquid were anatase type particles of about 5 nm in size. Next, this sol liquid was hydrothermally aging treated at 250° C. for 16 hours, then centrifuged to obtain white crystals. Water was added to white crystalline titanium oxide obtained by centrifugation, then the mixture was again centrifuged to recover titanium oxide nanoparticles, thus the nanoparticles being washed. X-ray diffractometry of the white crystalline particles revealed that the particles are anatase type particles of about 15 nm in size.

Additionally, size and dispersibility of the titanium oxide nanoparticles may be changed depending upon the purpose and end-use of the "light amount control system". A desired size and dispersibility of the particles can be obtained by controlling (i) pH, temperature and aging period upon formation of the sol liquid and (ii) pH, temperature and aging period in the hydrothermally aging treatment.

(ii) Coating of the Titanium Oxide Nanoparticles:

To the washed titanium oxide nanoparticles were added polyethylene glycol (molecular weight: 20,000), Triton X (polyoxyethylene (10) octylphenyl ether), ethanol, water and concentrated nitric acid, and the mixture was uniformly stirred to prepare a coating solution. As a coating plate, a 1-mm thick transparent glass having coated thereon an electrically conductive ITO-evaporated film was used. The coating solution was uniformly coated on the ITO film formed on the transparent electrically conductive glass plate in an amount of 8 g/m² in terms of titanium oxide. After the coating, the glass plate was baked at 450° C. for 30 minutes to remove the high polymer, thus preparing a titanium oxide porous electrode. The thus-obtained electrode had a surface roughness coefficient of about 750. The surface resistance of the titanium oxide layer was $1.1 \times 10^8$ Ω/□, and the volume resistivity thereof was $3.3 \times 10^4$ Ω·cm. Additionally, the thickness of titanium oxide nanoparticle layer may be changed depending upon the purpose and end-use of the "light amount control system".

(iii) Adsorption of Chromic Dye

As the chromic dye, chromic dyes (V-1) and (P-1) were used. Chromic dye V-1 has the property of being colored when reduced at anode (−electrode), and chromic dye P-1 has the property of being colored when oxidized at cathode (+electrode). Colors of chromic dyes V-1 and P-1 in a colored state are different from each other. That is, upon coloration, the two chromic materials undergo the change in optical density at different wavelengths.

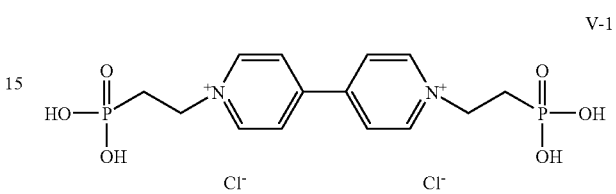

V-1

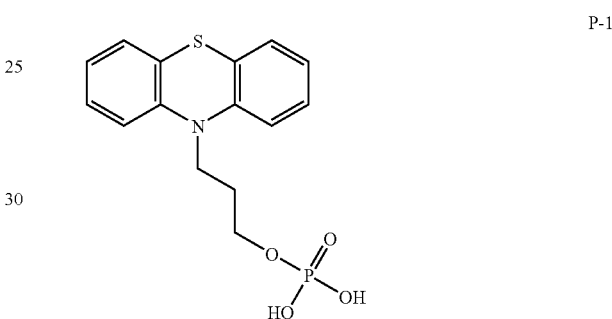

P-1

V-1 was dissolved in water, and P-1 was dissolved in a mixed solvent of chloroform and methanol, each in an amount of 0.02 mol/l. Two sheets of glass provided with the titanium oxide porous electrode prepared in (ii) were prepared, and separately dipped in the respective dye solutions at room temperature for 24 hours to conduct chemosorption. After the chemosorption, the glass sheets were washed with respective solvents, then dried in vacuo.

Additionally, as to method of adsorbing the chromic dyes onto the titanium oxide nanoparticles, there are a method of mixing the titanium oxide nanoparticles prepared in (i) into the coating solution before coating the coating solution and a method of mixing upon formation of the titanium oxide nanoparticles in (i).

(iv) Formation of Filter Element

Figure 10:
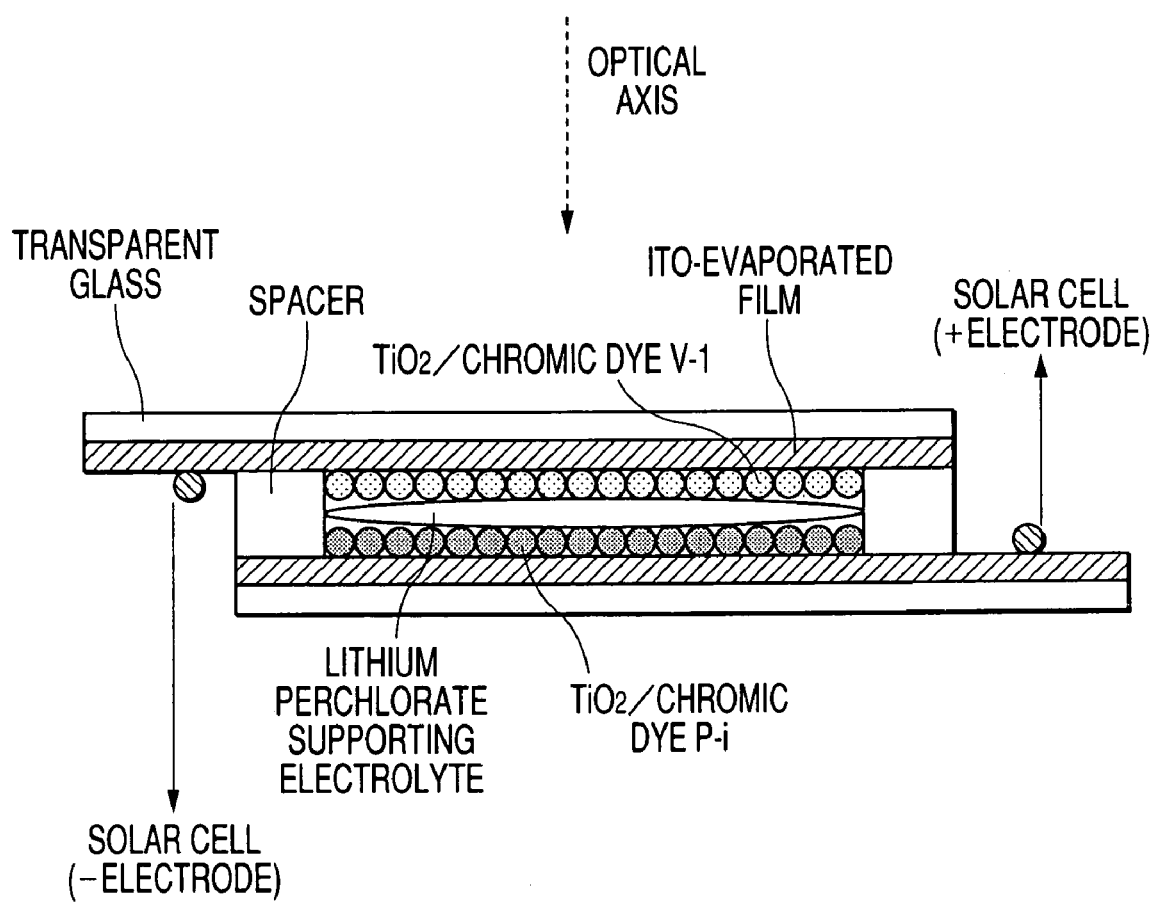
FIG. 10 is a schematic cross-sectional view showing the constitution of one example (light amount control filter) of the optical density-changing element of the invention.

The titanium oxide-coated conductive glass plate having adsorbed thereon V-1 dye and the titanium oxide-coated conductive glass plate having adsorbed thereon P-1 dye were faced to each other as shown in FIG. 10 using a 25-μm thick spacer, and a 0.2 mol/l solution of lithium perchlorate was enclosed as an electrolyte in the space to form a filter element. In this occasion, the two conductive glass plates were cut into a size of 22×22 mm to use, and a silver wire was connected to the conductive layer of each electrode. Upon connecting to a solar cell, the V-1 dye-adsorbed titanium oxide electrode was connected to (−) electrode of the solar cell, and the P-1 dye-adsorbed titanium oxide electrode was connected to (+) electrode of the solar cell.

(2) Solar Cell

Figure 11:
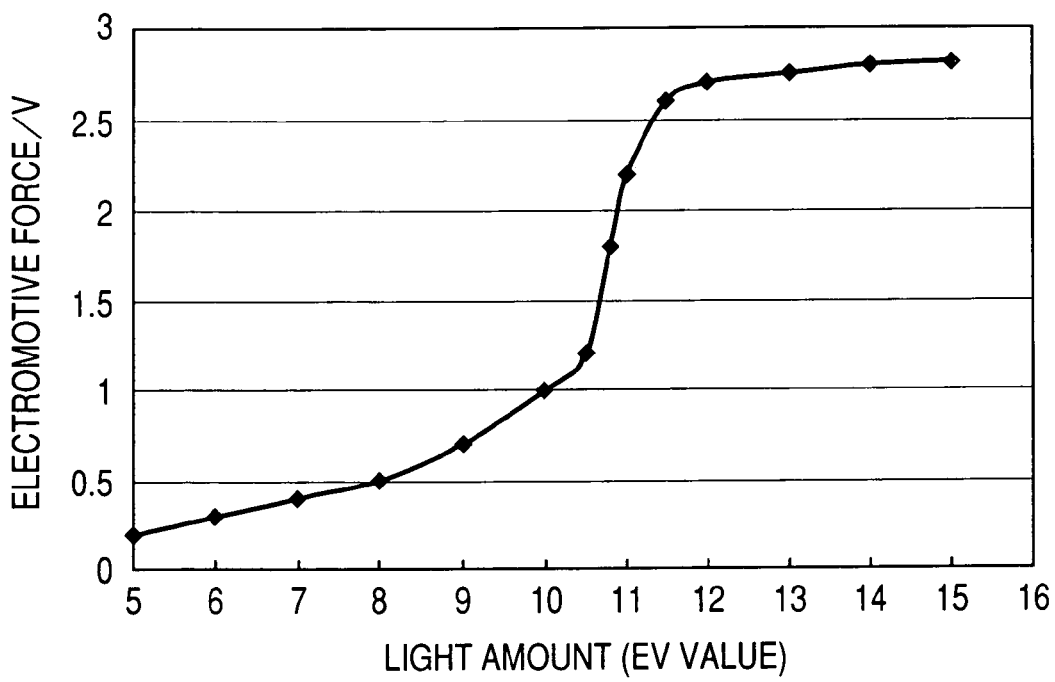
FIG. 11 is a graph showing electromotive force response characteristics of the solar cell used in Example 1.

As the solar cell, silicon type SS-3012DS (manufactured by SINONAR) was used. Unit cells of the solar cell were connected in series so as to generate an electromotive force of about 3 V. Electromotive force characteristics of the used solar cell against the light amount of pseudo sunlight (xenon lamp; manufactured by Oriel; using AM 1.5 spectral filter) are shown in FIG. 11.

A film-with-lens unit having the constitution shown in the following Table 13 was prepared by using the above-mentioned (1) light amount control filter and (2) solar cell. ISO speed of the used film was 1600, aperture was F8, and shutter speed was 1/85". In the case of using a photographic system constituted under such conditions, a photographic negative with an optimal density can be obtained by photographing under the condition of EV=8.4.

TABLE 13

| Sample | Solar Cell | Light Amount Control Filter |
|---|---|---|
| 901 (Comparative example) | not used | not used |
| 902 (present invention) | used | used |

Figure 12:
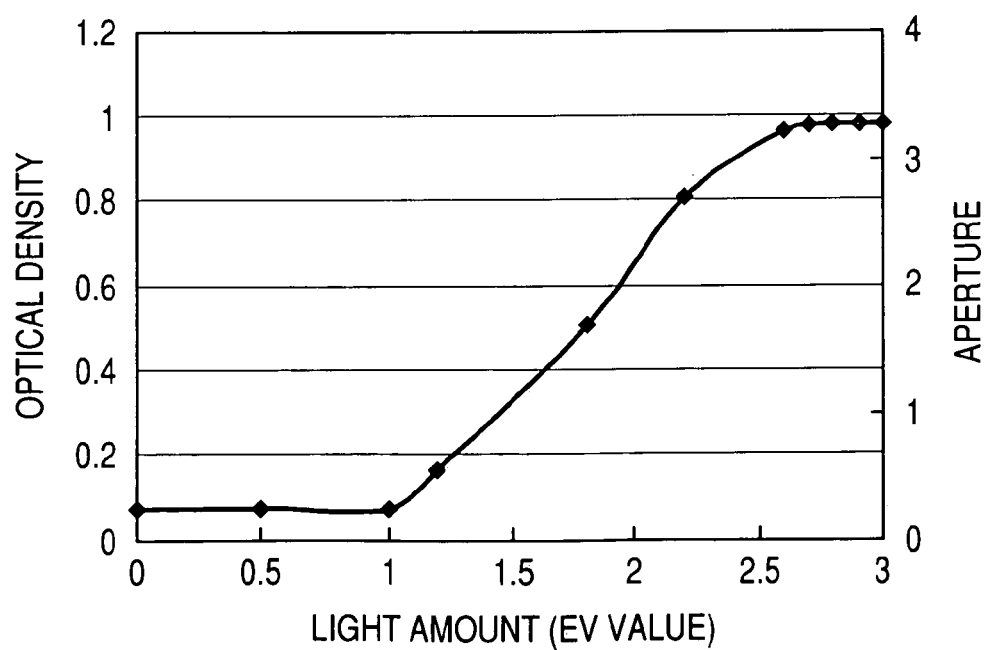
FIG. 12 is a graph showing electromotive force response characteristics of the light amount control filter prepared in Example 1.
Figure 13:
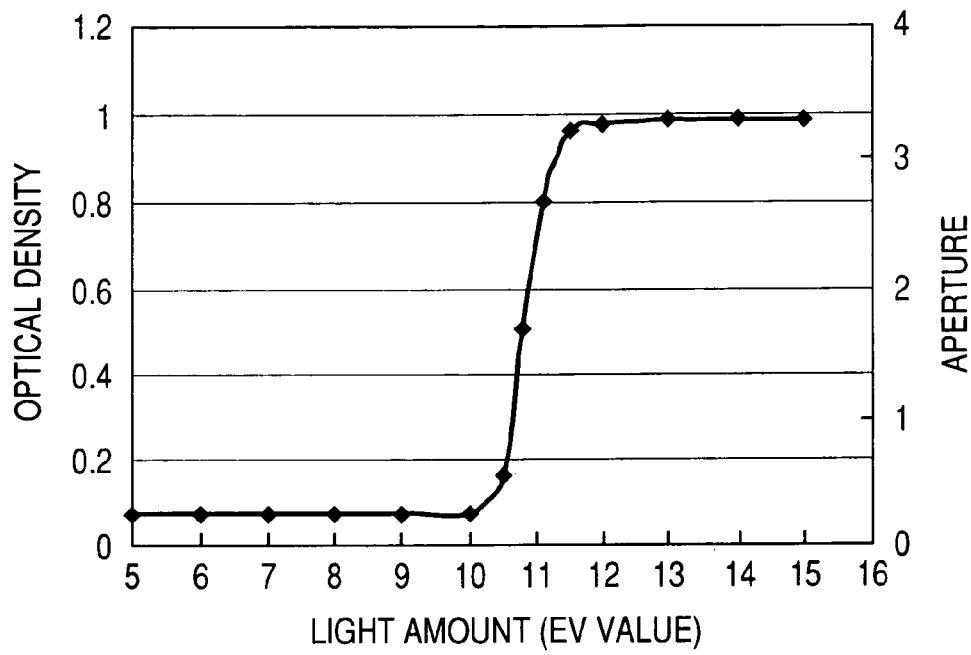
FIG. 13 is a graph showing electromotive force response characteristics of the optical element of the invention prepared in Example 1.

The optical density characteristics against the electromotive force of the solar cell in the optical element used for the sample 902 are shown in FIG. 12. Also, the optical density response characteristics against the light amount of the optical element wherein the solar cell is connected to the light amount control filter obtained from the above results are shown in FIG. 13. Additionally, the optical density as shown here is an average value in the range of from 400 nm to 700 nm in λ. In FIGS. 12 and 13, divisions of aperture for showing how an increase in optical density of each optical element corresponds to "stop down" ordinarily employed for a photographic system are also described. Additionally, to increase the aperture by +1 corresponds to reduction of the amount of transmitted light to a half level, and corresponds to an increase by 0.3 in terms of optical density. As is shown in FIG. 13, the aperture of this optical element is +0.2 upon shielding light and, when a light of 11.0 in EV is irradiated, the aperture increased to +2.8 and, when a light of 11.5 or more in EV is irradiated, the aperture increased to +3.2. The response time for the change was 2 seconds. Additionally, the term "EV" as used herein means a value which shows brightness and is calculated by the following relation:

$EV=\log_2(L/2.4)$ wherein L represents brightness in terms of the practical unit for illuminance of lux.

To mention in relation to the aperture, an increase in aperture of an optical element by +1 corresponds to reduction of the brightness of light received through the optical element, EV value, by 1.

Scenes of from EV=6.4 (corresponding to dark room) to EV=15.4 (corresponding to midsummer fine weather) using the above-mentioned units 901 and 902, followed by CN-16 development processing (Fuji Photo Film Co., Ltd.) for 3 minutes and 15 seconds. Comparison of exposure level of the resulting photographic negatives is shown in Table 14. Additionally, the term "exposure level" as used herein means that obtained by evaluating properness of the density of the processed photographic negative, taking the density of optimal photographic negative as 0.

In the case of the photographic system used here as mentioned above, a photographic negative with the optimal density can be obtained by photographing under the condition of EV=8.4. That is, the exposure level=0. The term "exposure level +1" as used herein means that the density is darker than the proper gray density by one aperture unit (=0.3 higher in terms of optical density), and the term "exposure level −1" as used herein means that the density is brighter than the proper gray density by one aperture unit (0.3 lower in terms of optical density).

TABLE 14

| | Photographing Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 901 (Comparative Example) | −2.0 | −1.0 | 0 | +1.0 | +2.0 | +3.0 | +4.0 | +5.0 | +6.0 | +7.0 |
| 902 (present invention) | −2.2 | −1.2 | −0.2 | +0.8 | +1.8 | +0.0 | +0.8 | +1.8 | +2.8 | +3.8 |

In the case of printing using the thus-obtained photographic negative, a certain measure of deviation of exposure level can be corrected. Specifically, a photographic negative of from −1 to +4 in exposure level can be corrected upon printing, and a "successful photograph" can be obtained. In case where exposure level is not within the above-mentioned range, correction upon printing is not enough, resulting in "unsuccessful photograph". Results of whether photographs obtained by printing from the photographic negatives obtained under the above-mentioned conditions was successful or unsuccessful are tabulated in Table 15. In Table 15, "O" represents successful photographs, and "x" represents unsuccessful photographs.

TABLE 15

| | Photographing Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 901 (Comparative Example) | x | ○ | ○ | ○ | ○ | ○ | ○ | x | x | X |
| 902 (present invention) | x | x | ○ | ○ | ○ | ○ | ○ | ○ | ○ | ○ |

It is seen from Table 15 that, in comparison with the comparative sample 901 not having a light amount control system, the sample 902 of the invention having a light amount control system has a greatly enlarged photographable region under the condition of high illuminance (EV value being large) though a photographable region under the condition of low illuminance (EV value being small) is narrowed to some extent. Thus, a camera system having an overall broad photographable region is realized.

EXAMPLE 10

An example of mounting, on a film-with-lens unit, an optical element of the invention prepared by using an optical density-changing element showing a low optical density in a bleached state is shown below.

Appearance and functions of the film-with-lens unit are the same as in Example 9. Details on (1) light amount control filter and (2) solar cell and methods for preparing them are described below.

(1) Light Amount Control Filter

A light amount control filter was prepared in the order of (i) coating of tin oxide nanoparticles, (ii) adsorption of a chromic dye and (ii) formation of a filter element. In this occasion, two kinds of filters I and II were prepared using two kinds of particles.

I-(i) Coating of Tin Oxide Nanoparticles

To an aqueous dispersion of tin oxide of 10 nm in diameter was added polyethylene glycol (molecular weight: 20,000), and the resulting mixture was uniformly stirred to prepare a coating solution. As a coating plate, a 0.7-mm thick transparent glass having an antireflective film and having thereon an electrically conductive $SnO_2$-sputtered film was used. The coating solution was uniformly coated on the $SnO_2$ film formed on the transparent electrically conductive glass plate in an amount of 9 g/m² in terms of tin oxide. After the coating, the glass plate was baked at 450° C. for 30 minutes to remove the high polymer, thus a tin oxide porous electrode being prepared. The thus-obtained electrode had a surface roughness coefficient of about 750. The surface resistance of the tin oxide layer was $1.0 \times 10^7$ Ω/□, and the volume resistivity thereof was $3.0 \times 10^3$ Ω·cm.

Light amount control filter I was obtained in the same manner as in Example 9 except for changing the porous electrode in the steps of I-(ii) adsorption of a chromic dye and I-(iii) formation of filter element.

II-(i) Coating of Tin Oxide Nanoparticles

To an aqueous dispersion of tin oxide of 2 nm in diameter was added polyethylene glycol (molecular weight: 20,000), and the resulting mixture was uniformly stirred to prepare a coating solution. As a coating plate, a 0.7-mm thick transparent glass having an antireflective film and having thereon an electrically conductive $SnO_2$-sputtered film was used. The coating solution was uniformly coated on the $SnO_2$ film formed on the transparent electrically conductive glass plate, followed by baking the glass plate at 550 C. for 30 minutes to remove the high polymer. The coating and baking were repeated till the total amount of tin oxide became 2 g/m² to obtain a tin oxide porous electrode. The thus-obtained electrode had a surface roughness coefficient of about 860. The surface resistance of the tin oxide layer was $1 \times 10^6$ Ω/□, and the volume resistivity thereof was 100 Ω·cm.

Light amount control filter II was obtained in the same manner as in Example 9 except for changing the porous electrode in the steps of I-(ii) adsorption of a chromic dye and I-(iii) formation of filter element.

As a solar cell, the same one as used in Example 9 was used.

A film-with-lens unit having the constitution shown in the following Table 16 was prepared by using the above-mentioned (1) light amount control filters I and II, light amount control filter X prepared by the same manner as Example 9 and (2) solar cell. ISO speed of the used film was 1600, aperture was F8, and shutter speed was 1/85".

TABLE 16

| Sample | Solar Cell | Light Amount Control Filter |
|---|---|---|
| 1001 (Comparative example) | not used | not used |
| 1002 (present invention) | used | Titanium oxide-using filter X |
| 1003 (present invention) | used | Titanium oxide-using filter I |
| 1004 (present invention) | used | Titanium oxide-using filter II |

Figure 14:
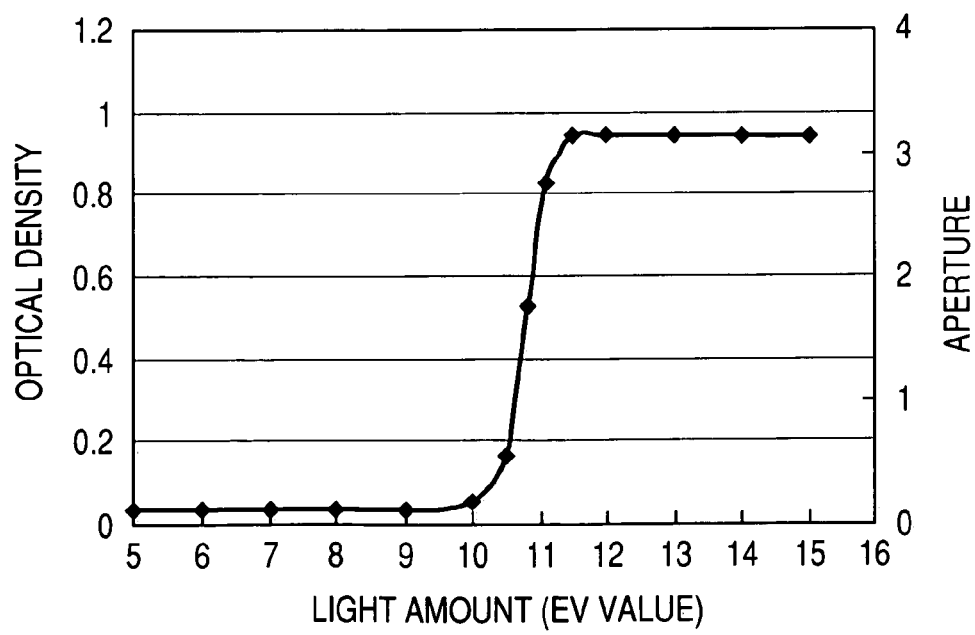
FIG. 14 is a graph showing electromotive force response characteristics of the optical element of the invention prepared in Example 1.

FIG. 14 shows response characteristics of the optical element used in sample 1003 as to optical density and aperture value against light amount. As is shown in FIG. 14, the aperture of this optical element was +0.1 upon shielding of light and, when irradiated with a light of 11.5 or more in EV, the aperture increased up to +3.1. The response time for the change was 1.5 seconds. The characteristics of the element used in sample 1004 were approximately the same as those of the element used in sample 1003. Also, the optical density of the optical elements used in samples 1002 to 1004 at 400 nm in λ upon shielding light, the average value of optical densities in the range of from 400 to 500 nm in λ, the average value of optical densities in the range of from 500 to 600 nm in λ, and the average value of optical densities in the range of from 600 to 700 nm in λ are shown in Table 17. It is seen that, in comparison with the optical element of sample 1002, the optical elements of samples 1003 and 1004 showed lower optical densities at 400 nm and lower average optical densities in the range of from 400 to 500 nm in λ upon shielding of light.

TABLE 17

| Sample No. | Optical Density ($\lambda$ = 400 nm) | Optical Density ($\lambda$ = 400–500 nm) | Optical Density ($\lambda$ = 500–600 nm) | Optical Density ($\lambda$ = 600–700 nm) |
|---|---|---|---|---|
| 1002 (present invention) | 0.220 | 0.132 | 0.048 | 0.042 |
| 1003 (present invention) | 0.120 | 0.067 | 0.032 | 0.038 |
| 1004 (present invention) | 0.050 | 0.038 | 0.030 | 0.038 |

Scenes of from EV=6.4 (corresponding to brightness within a room) to EV=15.4 (corresponding to brightness of midsummer fine weather) using the above-mentioned units 1001 to 1002, followed by CN-16 development processing (Fuji Photo Film Co., Ltd.) for 3 minutes and 15 seconds. Comparison of exposure level of the resulting negatives thus obtained is shown in Table 18.

It is seen from Table 19 that, in comparison with the comparative sample 1001 not having a light amount control system, the samples 1002, 1003 and 1004 of the invention having a light amount control system has a more enlarged photographable region.

Next, samples 1001 to 1004 were subjected to gray exposure of an intensity corresponding to 8.4 in EV value, and densities of B layer, G layer and R layer of each of the photographic negatives obtained from respective samples by photographic processing were measured to compare the results between the units for evaluating color balance. (A sample which provided a photographic negative having density difference between the layers within 0.03 was rated as "O".) As the development processing, CN-16 development processing (Fuji photo Film Co., Ltd.) was conducted for 3 minutes and 15 seconds. The results thus obtained are shown in Table 20 in contrast with the optical density values of the units formerly shown in Table 17.

TABLE 18

| | Photographing Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 1001 (Comparative Example) | −2.0 | −1.0 | 0 | +1.0 | +2.0 | +3.0 | +4.0 | +5.0 | +6.0 | +7.0 |
| 1002 (present invention) | −2.2 | −1.2 | −0.2 | +0.8 | +1.8 | +0.0 | +0.8 | +1.8 | +2.8 | +3.8 |
| 1003 (present invention) | −2.1 | −1.1 | −0.1 | +0.9 | +1.9 | +0.1 | +0.9 | +1.9 | +2.9 | +3.9 |
| 1004 (present invention) | −2.1 | −1.1 | −0.1 | +0.9 | +1.9 | +0.1 | +0.9 | +1.9 | +2.9 | +3.9 |

Results of whether photographs obtained by printing from the photographic negatives obtained under the above-mentioned conditions was successful or unsuccessful are tabulated in Table 19. In Table 19, "O" represents successful photographs, and "x" represents unsuccessful photographs.

TABLE 19

| | Photographing Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 1001 (Comparative Example) | x | o | o | o | o | o | o | x | x | X |
| 1002 (present invention) | x | x | o | o | o | o | o | o | o | o |
| 1003 (present invention) | x | x | o | o | o | o | o | o | o | o |
| 1004 (present invention) | x | x | o | o | o | o | o | o | o | o |

TABLE 20

| Sample No. | Optical Density of Filter ($\lambda$ = 400 nm) | Optical Density of Filter ($\lambda$ = 400–500 nm) | Optical Density of Filter ($\lambda$ = 500–600 nm) | Optical Density of Filter ($\lambda$ = 600–700 nm) | Color Balance |
|---|---|---|---|---|---|
| 1001 (comparative example) | — | — | — | — | ○ |
| 1002 (present invention) | 0.220 | 0.132 | 0.048 | 0.042 | 0.08 in density difference |
| 1003 (present invention) | 0.120 | 0.067 | 0.042 | 0.038 | ○ |
| 1004 (present invention) | 0.050 | 0.038 | 0.030 | 0.038 | ○ |

Table 20 shows the following. That is, when photographing using samples 1003 and 1004 which satisfy the condition that the optical density at $\lambda$=400 nm is 0.125 or less and all of the average value of the optical densities in the range of from 400 nm to 500 nm in $\lambda$, the average value of the optical densities in the range of from 500 to 600 in $\lambda$ and the average value of the optical densities in the range of from 600 to 700 in $\lambda$ are 0.1 or less, color balance of the photographic negatives obtained by gray exposure was at an superior level, but, when photographing using sample 1002 which had an optical density at $\lambda$=400 nm as high as 0.220 and the average value of the optical densities in the range of from 400 nm to 500 nm in $\lambda$ as high as more than 0.1 in $\lambda$, color balance of the photographic negative obtained by gray exposure was not as good as that of samples 1003 and 1004.

EXAMPLE 11

This Example shows an example of a film-with-lens unit having mounted thereon the optical element of the invention prepared by using an optical density-changing element having a metal oxide layer with a low resistance and showing a low optical density in a bleached state.

Appearance and functions of the film-with-lens unit are the same as in Example 9. Descriptions on (1) light amount control filter and (2) solar cell are given below.

(1) Light Amount Control Filter

Four filters III, IV, V and VI were prepared in the following manner.

III-(i) Preparation of Titanium Oxide Nanoparticles

Titanium oxide nanoparticles were prepared in the same manner as in Example 9, (i).

[0103]

III-(ii) Coating of the Titanium Oxide Nanoparticles

Coating was conducted in the same manner as in Example 9, provided that baking after coating was not conducted. The resultant electrode had a surface roughness coefficient of about 750, a surface resistance of $8.0 \times 10^8$ $\Omega/\square$, and a volume resistivity of $2.4 \times 10^5$ $\Omega \cdot cm$.

III-(iii) Adsorption of Chromic Dye and III-(iv) Formation of Filter

The same procedures as in (iii) and (iv) were conducted except for changing the porous electrode to obtain light amount control filter III.

IV-(i) Preparation of Titanium Oxide Nanoparticles

Titanium oxide nanoparticles were prepared in the same manner as in Example 9, (i).

IV-(ii) Coating of the Titanium Oxide Nanoparticles

Coating was conducted in the same manner as in example 9, (ii). The resultant electrode had a surface roughness coefficient of about 750, a surface resistance of $1.1 \times 10^8$ $\Omega/\square$, and a volume resistivity of $3.3 \times 10^4$ $\Omega \cdot cm$.

IV-(iii) Adsorption of Chromic Dye and IV-(iv) Formation of Filter

The same procedures as in Example 9, (iii) and (iv) were conducted except for changing the porous electrode to obtain light amount control filter IV.

V-(i) Coating of the Titanium Oxide Nanoparticles

Coating was conducted in the same manner as in Example 10, II-(i). The resultant electrode had a surface roughness coefficient of about 860, a surface resistance of $1.0 \times 10^6$ $\Omega/\square$, and a volume resistivity of 100 $\Omega \cdot cm$.

V-(ii) Adsorption of Chromic Dye and V-(iii) Formation of Filter

The same procedures as in Example 10, II-(ii) and (iii) were conducted to obtain light amount control filter V.

VI-(i) Coating of Antimony-Doped Tin Oxide Nanoparticles

To an aqueous dispersion of antimony-doped tin oxide of 5 nm in diameter was added polyethylene glycol (molecular weight: 20,000), and the resulting mixture was uniformly stirred to prepare a coating solution. As a coating plate, a 0.7-mm thick transparent glass having an antireflective film and having thereon an electrically conductive $SnO_2$-sputtered film was used. The coating solution was uniformly coated on the $SnO_2$ film formed on the transparent electrically conductive glass plate, and the glass plate was baked at 450° C. for 30 minutes to remove the high polymer. The coating and baking were repeated till the total amount of antimony-doped tin oxide became 2 $g/m^2$, thus an antimony-doped tin oxide porous electrode being prepared. The thus-obtained electrode had a surface roughness coefficient of about 860. The surface resistance of the antimony-doped tin oxide layer was $9.0 \times 10^4$ $\Omega/\square$, and the volume resistivity thereof was 3.6 $\Omega \cdot cm$.

VI-(ii) Coating of Tin Oxide Nanoparticles

To an aqueous dispersion of tin oxide of 2 nm in diameter was added polyethylene glycol (molecular weight: 20,000), and the resulting mixture was uniformly stirred to prepare a coating solution. As a coating plate, a 0.7-mm thick transparent glass having an antireflective film and having thereon an electrically conductive $SnO_2$-sputtered film was used. The coating solution was uniformly coated on the $SnO_2$ film formed on the transparent electrically conductive glass plate, and the glass plate was baked at 550° C. for 30 minutes to remove the high polymer. The coating and baking were repeated till the total amount of tin oxide became 2 $g/m^2$, thus a tin oxide porous electrode being prepared. The thus-obtained electrode had a surface roughness coefficient of about 860. The surface resistance of the tin oxide layer was $1 \times 10^6$ $\Omega/\square$, and the volume resistivity thereof was 100 $\Omega \cdot cm$.

VI-(iii) Adsorption of Chromic Dye

Chromic dyes V-1 and P-1 were used as chromic dyes. V-1 was dissolved in water, and P-1 was dissolved in a mixed solvent of chloroform and ethanol, each in a concentration of 0.02 mol/l. The antimony-doped tin oxide porous electrode prepared in VI-(i) was dipped in the P-1 solution, and the tin oxide porous electrode prepared in VI-(ii) was dipped in the V-1 solution for 24 hours to conduct chemosorption. After the chemosorption, the glass plates were washed with respective solvents, then dried in vacuo.

VI-(vi) Formation of Filter Element

The antimony-doped titanium oxide porous electrode having adsorbed thereon P-1 dye and being prepared in VI-(iii) and the titanium oxide porous electrode having adsorbed thereon V-1 dye were faced to each other as shown in FIG. 10 using a 25-μm thick spacer, and a 0.2 mol/l solution of lithium perchlorate was enclosed as an electrolyte in the space to form a filter element VI. In this occasion, the two conductive glass plates were cut into a size of 22×22 mm to use, and a silver wire was connected to the conductive layer of each electrode. Upon connecting to a solar cell, the V-1 dye-adsorbed titanium oxide electrode was connected to (−) electrode of the solar cell, and the P-1 dye-adsorbed titanium oxide electrode was connected to (+) electrode of the solar cell.

(2) Solar Cell

As the solar cell, the same one as in Example 9 was used.

Film-with-lens units having the constitution shown in the following Table 21 were prepared by using the above-mentioned light amount control filters III to VI and solar cell (2). ISO speed of the used film was 1600, aperture was F8, and shutter speed was 1/85".

TABLE 21

| Sample | Solar Cell | Light Amount Control Filter |
| --- | --- | --- |
| 1101 (Comparative example) | not used | not used |
| 1102 (present invention) | used | filter III (using titanium oxide) |
| 1103 (present invention) | used | filter IV (using titanium oxide) |
| 1104 (present invention) | used | filter V (using tin oxide) |
| 1105 (present invention) | used | filter VI (using antimony-doped titanium oxide) |

The optical density characteristics against the electromotive force of the solar cell in the optical element used for the sample 1105 are approximately the same as that of the optical element used in sample 1104. (see data in Example 10).

Figure 15:
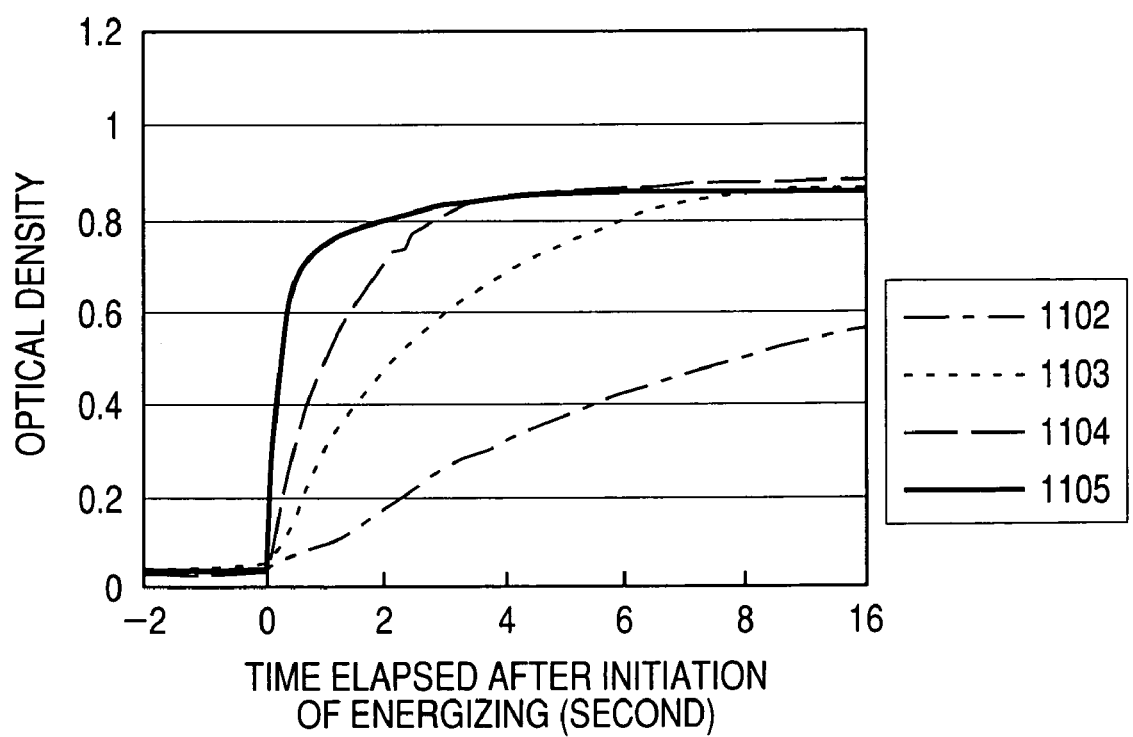
FIG. 15 is a graph showing change with time of electromotive force response of the light amount control filter prepared in Example 3.

On the other hand, changes of response time of the optical density with time upon applying an electromotive force of 2.5 V to the optical elements used in samples 1103 to 1105 from the solar cell are shown in FIG. 15. It is seen from FIG. 15 that, in comparison with the optical elements used in samples 1103 and 1104, the optical element used in sample 1105 is excellent in response speed. The response time for the optical change of optical element used in sample 105 was 0.3 second.

Scenes of from EV=6.4 (corresponding to brightness in a room) to EV=15.4 (corresponding to brightness of midsummer fine weather) using the above-mentioned units 1101 to 1105, followed by CN-16 development processing (Fuji Photo Film Co., Ltd.) for 3 minutes and 15 seconds. Comparison of exposure level of the resulting photographic negatives is shown in Table 22.

TABLE 22

| | Photographing Condition | | | | | | | | | |
| --- | --- | --- | --- | --- | --- | --- | --- | --- | --- | --- |
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 1101 (Comparative Example) | −2.0 | −1.0 | 0 | +1.0 | +2.0 | +3.0 | +4.0 | +5.0 | +6.0 | +7.0 |
| 1102 (present invention) | −2.2 | −1.2 | −0.2 | +0.8 | +1.8 | +0.0 | +0.8 | +1.8 | +2.8 | +3.8 |
| 1103 (present invention) | −2.2 | −1.2 | −0.2 | +0.8 | +1.8 | +0.0 | +0.8 | +1.8 | +2.8 | +3.8 |
| 1104 (present invention) | −2.1 | −1.1 | −0.1 | +0.9 | +1.9 | +0.1 | +0.9 | +1.9 | +2.9 | +3.9 |
| 1104 (present invention) | −2.1 | −1.1 | −0.1 | +0.9 | +1.9 | +0.1 | +0.9 | +1.9 | +2.9 | +3.9 |

Results of whether photographs obtained by printing from the photographic negatives obtained under the above-mentioned conditions was successful or unsuccessful are tabulated in Table 23. In Table 23, "O" represents successful photographs, and "x" represents unsuccessful photographs.

TABLE 23

| | Photographing Condition | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 1101 (Comparative Example) | x | o | o | o | o | o | o | x | x | X |
| 1102 (present invention) | x | x | o | o | o | o | o | o | o | o |
| 1103 (present invention) | x | x | o | o | o | o | o | o | o | o |
| 1104 (present invention) | x | x | o | o | o | o | o | o | o | o |
| 1104 (present invention) | x | x | o | o | o | o | o | o | o | o |

It is seen from Table 23 that, in comparison with the comparative sample 1101 not having a light amount control system, all of the samples 1102 to 1105 having a light amount control system have a more enlarged photographable region.

Next, response time for the optical change in the case of changing the scene of EV=8.4 to the scene of EV=15.4 in photographing using samples 1102 to 1105 was measured. The results thus obtained are shown in Table 24 together with the resistance values of the metal oxide layers in the light amount control filters used in respective units.

TABLE 24

| Sample No. | Response time for optical change for EV = 15.4 in place of EV = 8.4 | Surface resistance of metal oxide layer (Ω/□) | Volume resistivity of metal oxide layer (Ω · cm) |
|---|---|---|---|
| 1102 (comparative example) | 8 seconds | 8.0 × 10⁸ | 2.4 × 10⁵ |
| 1103 (present invention) | 2 seconds | 1.1 × 10⁸ | 3.3 × 10⁴ |
| 1104 (present invention) | 0.9 second | 1.0 × 10⁶ | 1.0 × 10² |
| 1105 (present invention) | 0.3 second | 9.0 × 10⁴ | 3.6 |

Table 24 shows the following. That is, comparison of the results on sample 1105 with the results on samples 1102 to 1104 reveals that response time for light amount control can be shortened by reducing the resistance of metal oxide layer having adsorbed thereon the chromic material and being used in the light amount control filter containing the chromic material.

EXAMPLE 12

This example is an example wherein the number of dyes is increased. A light amount control filter was prepared in the same manner as with the light amount control filter VI in Example 11 except for using 0.02 mol/l aqueous solution of a mixture of chromic dye V-1 and the following chromic dye V-4 in place of the 0.02 mol/l aqueous solution of chromic dye V-1 used in Example 9, and was connected to the same solar cell as in Example 11, then mounted on a film-with-lens unit. The same comparative experiment as with the film-with-lens unit of Example 11 revealed that the filter of the invention showed a light amount control effect setting a greater weight on depressing of red light. Thus, it is possible to prepare a light amount control element exhibiting a desired effect by using a combination of appropriate dyes.

Chromic Dye (V-4)

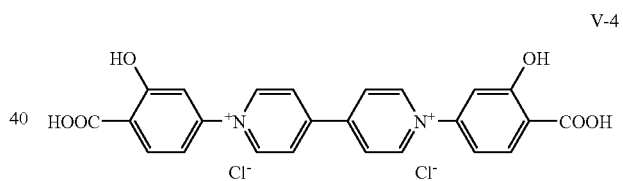

EXAMPLE 13

Figure 16:
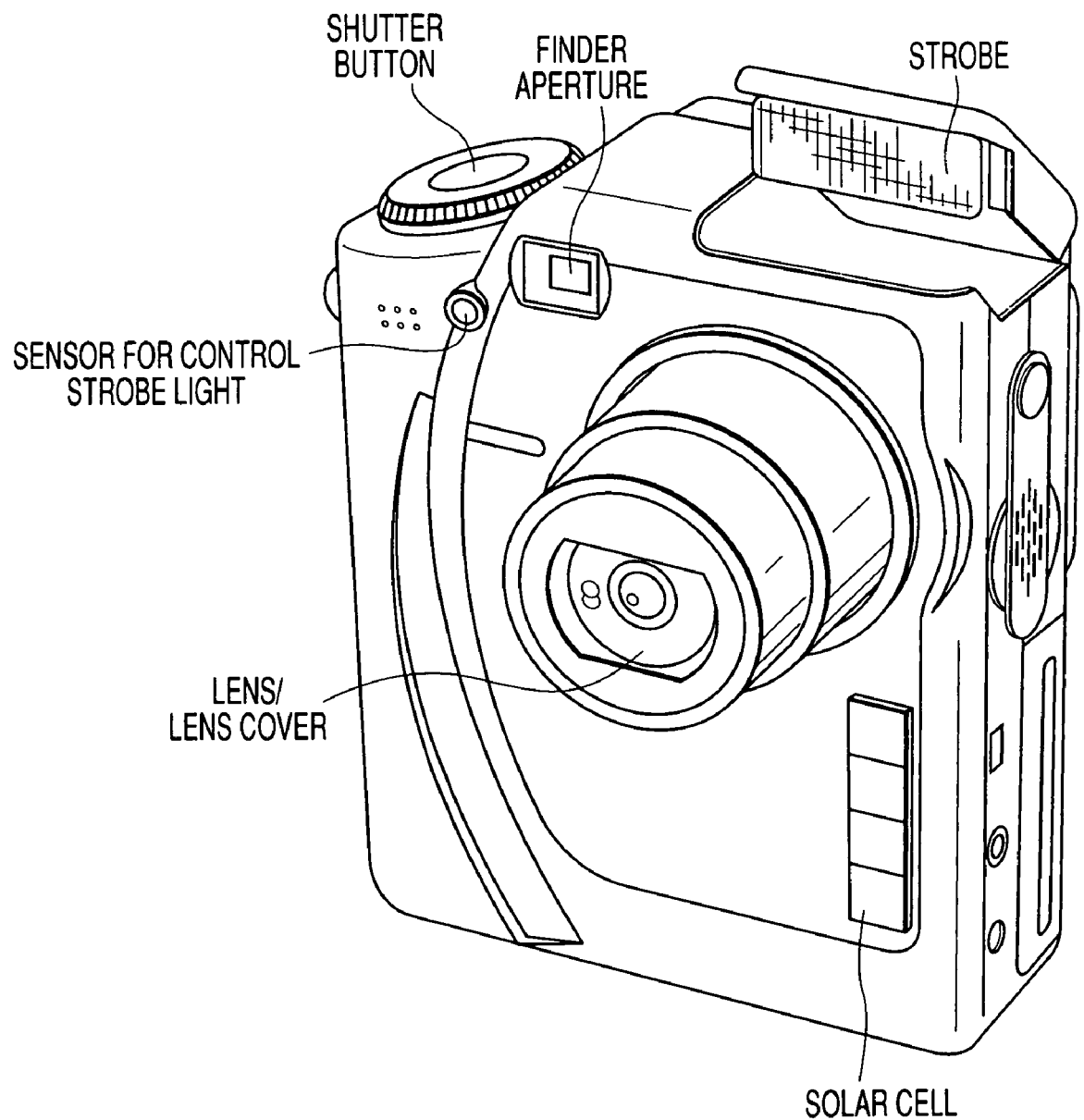
FIG. 16 is a schematic perspective showing one example of an electronic still camera having the optical element of the invention.

This example is an example wherein a light amount control filter is mounted on an electronic camera. As shown in FIG. 8, an electronic still camera of the invention had the light amount control filter VI prepared in Example 9 between a lens and CCD. Further, as shown in FIG. 16, the same solar cell as in Example 9 was provided in the housing. The same comparative experiment as with the film-with-lens unit of Example 9 was conducted using the electronic still camera, and it was found that electronic still cameras having a narrow dynamic range exhibited a more remarkable light amount-controlling effect than with the film-with-lens unit.

EXAMPLE 14

Figure 17A:
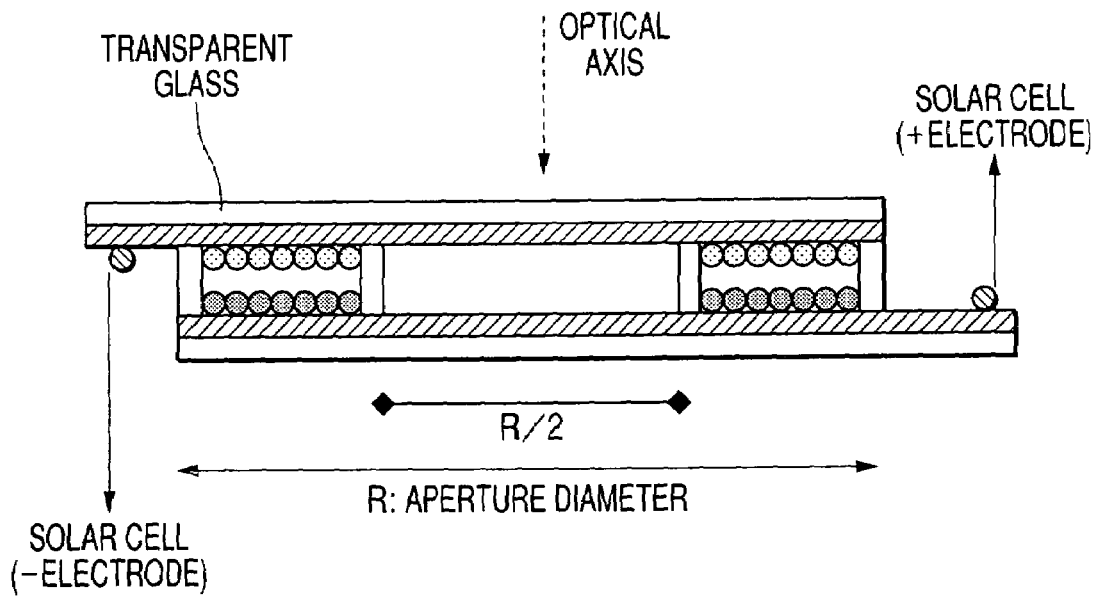
FIGS. 17A is a schematic cross-sectional view showing the constitution of one example (light amount control lens) of the optical density-changing element of the invention.
Figure 17B:
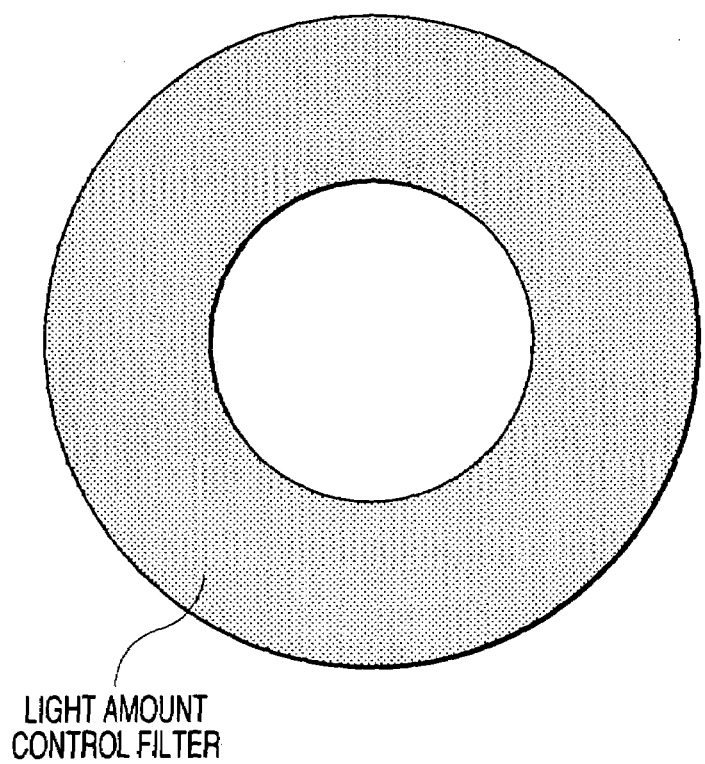
FIG. 17B is a schematic view of the upper side of the light amount control lens.

This Example is an example wherein an aperture-like light amount control lens was provided in a film-with-lens unit. An aperture-like light amount control lens was prepared as shown in FIG. 17 using the light amount control filter VI prepared in Example 9. A film-with-lens unit of the constitution shown in the following Table 25 was prepared.

In the case of providing a light amount control lens, it was provided in front of an aperture of the film-with-lens unit. Photographing and developing tests were conducted under the same conditions as in Example 9.

TABLE 25

| Sample | Solar Cell | Light Amount Control Filter |
|---|---|---|
| 1401 (Comparative example) | not used | not used |
| 1402 (present invention) | used | used |

Scenes of from EV=6.4 (corresponding to brightness in a room) to EV=14.4 (corresponding to brightness of midsummer fine weather) using the above-mentioned units 1401 and 1402, followed by CN-16 development processing (Fuji Photo Film Co., Ltd.) for 3 minutes and 15 seconds. Comparison of exposure level of the resulting photographic negatives is shown in Table 26.

TABLE 26

| | Photographing Condition | | | | | | | | |
|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 |
| 1401 (Comparative Example) | −2.0 | −1.0 | 0 | +1.0 | +2.0 | +3.0 | +4.0 | +5.0 | +6.0 |
| 1402 (present invention) | −2.0 | −1.0 | 0 | +1.0 | +2.0 | +1.4 | +2.2 | +3.2 | +4.2 |

Results of whether photographs obtained by printing from the negatives obtained under the above-mentioned conditions were successful or unsuccessful are tabulated in Table 27. In Table 27, "O" represents successful photographs, and "x" represents unsuccessful photographs.

TABLE 27

| | Photographing Condition | | | | | | | | |
|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 |
| 1401 (Comparative Example) | x | o | o | o | o | o | o | x | x |
| 1402 (present invention) | x | o | o | o | o | o | o | o | X |

It is seen from Table 27 that, in comparison with the comparative sample 1401 not having a light amount control lens, the sample 1402 of the invention having a light amount control lens has a more enlarged photographable region.

EXAMPLE 15

This example is an example wherein a light amount control filter is used in a photographic unit for use in a mobile phone. The light amount control filter VI prepared in Example 9 was mounted on a lens of a photographic unit in a mobile phone and, further, the same solar cell as in Example 9 was provided around the photographic unit. It was found that the mobile phone having the unit of this Example permitted photographing under a wider exposure condition than with a photographic unit not having the optical element as in the invention.

The present application claims foreign priority based on Japanese Patent Application Nos. JP2003-323037, JP2004-95795 and JP2004-149490, filed Sep. 16 of 2003, Mar. 29, 2004 and May 19, 2004, respectively, the contents of which is incorporated herein by reference.

What is claimed is:

1. An optical density-changing element comprising:
   an anode containing a first semiconductor material,
   the anode further comprising at least one of:
   a material (a) capable of at least one of donating and accepting an electron, the material (a) undergoing a change in absorption spectrum in the wavelength range of 400 to 700 nm upon at least one of donating and accepting the electron, wherein the anode satisfies the relation of $$-1.3 \leq Fba - Eo(a) \leq 0.3$$

wherein Fba represents a flat band potential of the first semiconductor material and Eo(a) represents an oxidation potential of the material (a); and
   a material (b) capable of at least one of donating and accepting an electron, the material (b) undergoing substantially no change in absorption spectrum in the wavelength range of 400 to 700 nm upon at least one of donating and accepting the electron, wherein the anode satisfies the relation of $$-1.3 \leq Fba - Eo(b) \leq 0.3$$

wherein Fba represents the flat band potential of the first semiconductor material and Eo(b) represents an oxidation potential of the material (b); and
   a cathode containing a second semiconductor material,
   the cathode further comprising at least one of:
   a material (c) capable of at least one of donating and accepting an electron, the material (c) undergoing the change in absorption spectrum in the wavelength range of 400 to 700 nm upon at least one of donating and accepting the electron, wherein the cathode satisfies the relation of $$-0.3 \leq Fbc - Er(c) \leq 1.3$$

wherein Fbc represents a flat band potential of the second semiconductor material and Er(c) represents a reduction potential of the material (c); and a material (d) capable of at least one of donating and accepting an electron, the material (d) undergoing substantially no change in absorption spectrum in the wavelength range of 400 to 700 nm upon at least one of donating and accepting the electron, wherein the cathode satisfies the relation of $$-0.3 \leq Fbc - Er(d) \leq 1.3$$

wherein Fbc represents the flat band potential of the second semiconductor material and Er(d) represents a reduction potential of the material (d), wherein the optical density-changing material has at least one of (i) the material (a) in the anode, and (ii) the material (c) in the cathode; and the optical density-changing element undergoes the change in optical density in response to a voltage applied between the anode and the cathode.

2. The optical density-changing element according to claim 1, which contains in total at least three kinds of materials capable of at least one of donating and accepting an electron.

3. The optical density-changing element according to claim 1, which contains at least one of (iii) the material (b) in the anode, and (iv) the material (d) in the cathode.

4. The optical density-changing element according to claim 1, which is transformed into a bleached state in response to the voltage, the bleached state having an optical density of 0.2 or less at a wavelength of 400 nm.

5. The optical density-changing element according to claim 1, which is transformed into a bleached state in response to the voltage, the bleached state having a first average optical density of 0.1 or less in a first wavelength sub-range of 400 to 500 nm, a second average optical density of 0.1 or less in a second wavelength sub-range of 500 to 600 nm, and a third average optical density of 0.1 or less in a third wavelength sub-range of 600 to 700 nm.

6. The optical density-changing element according to claim 1, which has at least one of:

a first semiconductor layer in the anode, the first semiconductor layer comprising: the first semiconductor material; and the material (a) absorbed on the first semiconductor material, wherein the first semiconductor layer has a surface roughness coefficient of more than 20; and a second semiconductor layer in the cathode, the second semiconductor layer comprising:

the second semiconductor material; and the material (c) absorbed on the first semiconductor material wherein the second semiconductor layer has the surface roughness coefficient of more than 20.

7. The optical density-changing element according to claim 6, wherein at least one of the first semiconductor layer and the second semiconductor layer has a surface resistance of less than $2 \times 10^8$ $\Omega/\square$.

8. The optical density-changing element according to claim 6, wherein at least one of the first semiconductor layer and the second semiconductor layer has a volume resistivity of less than $1 \times 10^5$ $\Omega \cdot cm$.

9. The optical density-changing element according to claim 6, wherein at least one of the first semiconductor material and the second semiconductor material contains a semiconductor particle having a particle size of 1 to 100 nm.

10. The optical density-changing element according to claim 1, wherein at least one of the first semiconductor material and the second semiconductor material contains a tin oxide.

11. The optical density-changing element according to claim 1, wherein at least one of the first semiconductor material and the second semiconductor material contains a antimony-doped tin oxide.

12. The optical density-changing element according to claim 1, which has an antireflective layer.

13. An optical element comprising:

an optical density-changing element comprises: an anode containing a first semiconductor material; and a cathode containing a second semiconductor material, the optical density-changing element undergoing a change in optical density in response to an electromotive force between the anode and the cathode; and an electromotive force-generating element capable of generating the electromotive force between the anode and the cathode of the optical density-changing element in response to an electromagnetic wave, wherein the anode further comprising at least one of:

a material (a) capable of at least one of donating and accepting an electron, the material (a) undergoing the change in absorption spectrum in the wavelength range of 400 to 700 nm upon at least one of donating and accepting the electron, wherein the anode satisfies the relation of $$-1.3 \leq Fba - Eo(a) \leq 0.3$$

wherein Fba represents a flat band potential of the first semiconductor material and Eo(a) represents an oxidation potential of the material (a); and a material (b) capable of at least one of donating and accepting an electron, the material (b) undergoing substantially no change in absorption spectrum in the wavelength range of 400 to 700 nm upon at least one of donating and accepting the electron, wherein the anode satisfies the relation of $$-1.3 \leq Fba - Eo(b) \leq 0.3$$

wherein Fba represents the flat band potential of the first semiconductor material and Eo(b) represents an oxidation potential of the material (b); and the cathode further comprises at least one of:

a material (c) capable of at least one of donating and accepting an electron, the material (c) undergoing the change in absorption spectrum in the wavelength range of 400 to 700 nm upon at least one of donating and accepting the electron, wherein the cathode satisfies the relation of $$-0.3 \leq Fbc - Er(c) \leq 1.3$$

wherein Fbc represents a flat band potential of the second semiconductor material and Er(c) represents a reduction potential of the material (c); and a material (d) capable of at least one of donating and accepting an electron, the material (d) undergoing substantially no change in absorption spectrum in the wavelength range of 400 to 700 nm upon at least one of donating and accepting the electron, wherein the cathode satisfies the relation of $$-0.3 \leq Fbc - Er(d) \leq 1.3$$

wherein Fbc represents the flat band potential of the second semiconductor material and Er(d) represents a reduction potential of the material (d), and wherein the optical density-changing material has at least one of (i) the material (a) in the anode, and (ii) the material (c) in the cathode.

14. A photographic unit comprising an optical element according to claim 13.

15. The photographic unit according to claim 14, which is a film-with-lens unit.

16. An optical element comprising:
an electromotive force-generating element capable of generating an electromotive force in response to an electromagnetic wave; and
an optical density-changing element capable of undergoing a change in optical density in response to the electromotive force,
wherein the optical density-changing element comprises a semiconductor layer comprising: a semiconductor material; and a material capable of undergoing the change in optical density, the material being adsorbed on the semiconductor material, and
the semiconductor layer has a surface roughness coefficient of more than 20;
wherein the optical density-changing element contains at least two materials capable of absorbing a plurality of visible lights different from each other; and
wherein an optical density of the optical density-change element, upon irradiation with the electromagnetic wave, becomes 0.5 or more on average over a wavelength range of 400 to 700 nm.

17. The optical element according to claim 16, wherein the optical density-changing element is transformed into a bleached state in response to the electromotive force generated by the electromotive force-generating element, the bleached state having an optical density of 0.2 or less at a wavelength of 400 nm.

18. The optical element according to claim 16, wherein the optical density-changing element increases an optical density of the optical density-changing element in response to an electromotive force of 1 V or more generated by the electromotive force-generating element.

19. A photographic unit comprising an optical element according to claim 16.

20. The photographic unit according to claim 19, which is a film-with-lens unit.

* * * * *